United States Patent
Szucs et al.

(10) Patent No.: US 9,442,930 B2
(45) Date of Patent: *Sep. 13, 2016

(54) SYSTEM, METHOD AND COMPUTER PROGRAM PRODUCT FOR AUTOMATIC TOPIC IDENTIFICATION USING A HYPERTEXT CORPUS

(71) Applicants: John Joseph Szucs, Raleigh, NC (US); Kurtis Lee Warner, Woodbridge, VA (US); Thomas Carl Paris, Cameron, NC (US); Charles David Moye, Vienna, VA (US)

(72) Inventors: John Joseph Szucs, Raleigh, NC (US); Kurtis Lee Warner, Woodbridge, VA (US); Thomas Carl Paris, Cameron, NC (US); Charles David Moye, Vienna, VA (US)

(73) Assignee: Venio Inc., Woodbridge, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,472

(22) Filed: Mar. 14, 2013

(65) Prior Publication Data

US 2013/0204876 A1 Aug. 8, 2013

Related U.S. Application Data

(63) Continuation-in-part of application No. 13/607,639, filed on Sep. 7, 2012.

(60) Provisional application No. 61/532,094, filed on Sep. 7, 2011.

(51) Int. Cl.
*G06F 7/00* (2006.01)
*G06F 17/30* (2006.01)

(52) U.S. Cl.
CPC ... *G06F 17/30014* (2013.01); *G06F 17/30616* (2013.01); *G06F 17/30719* (2013.01); *G06F 17/30737* (2013.01)

(58) Field of Classification Search
None
See application file for complete search history.

(56) References Cited

U.S. PATENT DOCUMENTS

| | | | |
|---|---|---|---|
| 4,815,005 | A | 3/1989 | Oyanagi et al. |
| 4,839,853 | A | 6/1989 | Deerwester et al. |
| 4,849,898 | A | 7/1989 | Adi |
| 4,870,568 | A | 9/1989 | Kahle et al. |

(Continued)

FOREIGN PATENT DOCUMENTS

| | | |
|---|---|---|
| EP | 0386825 | 9/1990 |
| EP | 2045728 | 4/2009 |

OTHER PUBLICATIONS

Gabrilovich et al., Wikipedia-based Semantic Interpretation for Natural Language Processing. Journal of Artificial Intelligence Research 34. 2009.*

(Continued)

*Primary Examiner* — Sherief Badawi
*Assistant Examiner* — David T Brooks
(74) *Attorney, Agent, or Firm* — ATFirm PLLC; Ralph P. Albrecht

(57) ABSTRACT

A system, method, and/or computer program product for automatic topic identification using a hypertext corpus may include a) receiving a content document(s); b) identifying or lexically scoring candidate topic(s) in the received content document based on label(s) used in a corpus to link to or relate to the candidate topics; c) evaluating or semantically scoring the candidate topic(s) of the received document based on a relationship between two or more candidate topics in the corpus; and d) weighting candidate topics for relevance based on algorithmic or statistical analysis of links or relationships in the corpus.

17 Claims, 15 Drawing Sheets

(56) References Cited

U.S. PATENT DOCUMENTS

| | | | |
|---|---|---|---|
| 5,077,668 | A | 12/1991 | Doi |
| 5,128,865 | A | 7/1992 | Sadler |
| 5,321,833 | A | 6/1994 | Chang et al. |
| 5,384,703 | A | 1/1995 | Withgott et al. |
| 5,500,920 | A | 3/1996 | Kupiec |
| 5,544,049 | A | 8/1996 | Henderson et al. |
| 5,675,819 | A | 10/1997 | Schuetze |
| 5,696,962 | A | 12/1997 | Kupiec |
| 5,802,515 | A | 9/1998 | Adar et al. |
| 5,832,496 | A | 11/1998 | Anand et al. |
| 5,943,670 | A * | 8/1999 | Prager |
| 6,012,053 | A | 1/2000 | Pant et al. |
| 6,052,657 | A | 4/2000 | Yamron et al. |
| 6,167,368 | A | 12/2000 | Wacholer |
| 6,775,677 | B1 | 8/2004 | Ando et al. |
| 7,039,856 | B2 | 5/2006 | Peairs et al. |
| 7,117,437 | B2 | 10/2006 | Chen et al. |
| 7,233,943 | B2 * | 6/2007 | Modha et al. |
| 7,383,169 | B1 | 6/2008 | Vanderwende et al. |
| 7,509,572 | B1 | 3/2009 | Melander et al. |
| 7,555,427 | B2 | 6/2009 | Kirshenbaum |
| 7,607,083 | B2 | 10/2009 | Gong et al. |
| 7,689,410 | B2 | 3/2010 | Chang et al. |
| 7,853,603 | B2 | 12/2010 | Churin et al. |
| 7,873,640 | B2 | 1/2011 | Chang et al. |
| 8,032,827 | B2 | 10/2011 | Melander et al. |
| 8,156,142 | B2 | 4/2012 | Gruber |
| 8,886,623 | B2 * | 11/2014 | Garg et al. ............. 707/706 |
| 2004/0039734 | A1 | 2/2004 | Judd et al. |
| 2004/0117725 | A1 | 6/2004 | Chen et al. |
| 2004/0122657 | A1 | 6/2004 | Brants et al. |
| 2005/0149494 | A1 * | 7/2005 | Lindh et al. ............ 707/3 |
| 2007/0073678 | A1 | 3/2007 | Scott et al. |
| 2007/0106493 | A1 * | 5/2007 | Sanfilippo ........... G06F 17/2785 704/9 |
| 2008/0004864 | A1 * | 1/2008 | Gabrilovich ............ G06F 17/27 704/9 |
| 2008/0052289 | A1 * | 2/2008 | Kolo et al. ............ 707/6 |
| 2008/0263038 | A1 * | 10/2008 | Judge et al. ............ 707/6 |
| 2009/0024615 | A1 * | 1/2009 | Pedro et al. ............ 707/5 |
| 2009/0254540 | A1 * | 10/2009 | Musgrove et al. .......... 707/5 |
| 2010/0145678 | A1 * | 6/2010 | Csomai et al. ............ 704/9 |
| 2010/0185689 | A1 * | 7/2010 | Hu et al. ............ 707/803 |
| 2010/0280989 | A1 * | 11/2010 | Mehra et al. ............ 706/59 |
| 2010/0306144 | A1 * | 12/2010 | Scholz et al. ............ 706/20 |
| 2011/0040766 | A1 * | 2/2011 | Robinson ............ G06F 17/3053 707/749 |
| 2011/0087670 | A1 * | 4/2011 | Jorstad et al. ............ 707/741 |
| 2011/0173210 | A1 * | 7/2011 | Ahn et al. ............ 707/748 |
| 2011/0276581 | A1 * | 11/2011 | Zelevinsky ............ 707/766 |
| 2012/0047149 | A1 * | 2/2012 | Zhou et al. ............ 707/748 |
| 2012/0101965 | A1 * | 4/2012 | Hennig et al. ............ 706/12 |
| 2012/0278341 | A1 * | 11/2012 | ogilvy et al. ............ 707/749 |
| 2012/0331063 | A1 * | 12/2012 | Rajaram ............ 709/206 |
| 2013/0085745 | A1 * | 4/2013 | Koister et al. ............ 704/9 |
| 2013/0103389 | A1 * | 4/2013 | Gattani et al. ............ 704/9 |

OTHER PUBLICATIONS

Milne et al., Learning to link with Wikipedia. In Proceedings of the 17th ACM conference on Information and knowledge management (CIKM '08). ACM, New York, NY, USA, 509-518. 2008.*

Milne & Medelyan et al., Mining Domain-Specific Thesauri from Wikipedia: A Case Study. In Proceedings of the 2006 IEEE/WIC/ACM International Conference on Web Intelligence (WI '06). IEEE Computer Society, Washington, DC, USA, 442-448. 2006.*

Strube et al., WikiRelate! computing semantic relatedness using wikipedia. In proceedings of the 21st national conference on Artifical intelligence—vol. 2 (AAAI'06). 2006.*

Huang et al., Clustering Documents Using a Wikipedia-Based Concept Representation. In Proceedings of the 13th Pacific-Asia Conference on Advances in Knowledge Discovery and Data Mining (PAKDD '09), Thanaruk Theeramunkong, Boonserm Kijsirikul, Nick Cercone, and Tu-Bao Ho (Eds.). Springer-Verlag, Berlin, Heidelberg, 628-636. 2009.*

Medelyan, et al. Mining meaning from Wikipedia. International Journal of Human-Computer Studies 67.9: 716-754. 2009.*

Mihalcea et al., Wikify!: linking documents to encyclopedic knowledge. Proceedings of the sixteenth ACM conference on Conference on information and knowledge management. ACM, 2007.*

Milne et al., An effective, low-cost measure of semantic relatedness obtained from Wikipedia links. Proceeding of AAAI Workshop on Wikipedia and Artificial Intelligence: an Evolving Synergy, AAAI Press, Chicago, USA. 2008.*

Grineva et al., Extracting key terms from noisy and multitheme documents. Proceedings of the 18th international conference on World wide web. ACM, 2009.*

Medelyan et al., Topic indexing with Wikipedia. Proceedings of the AAAI WikiAI workshop. 2008.*

NPL, Jiang et al., "Semantic Similarity Based on Corpus Statistics and Lexical Taxonomy", Proceedings of International Conference Research on Computational Linguistics, 1997.*

Adamic, Lada A., and Huberman, Bernardo A., "Zipf's Law and the Internet," Glottometrics, 2002, vol. 3.

Chakrabarti, Soumen, Dom, Byron and Indyk, Piotr, "Enhanced Hypertext Categorization Using Hyperlinks," 1998.

Davies, Mark, "Word frequency data from the Corpus of Contemporary American English (COCA)" [Online], 2011, [last Accessed: Aug. 27, 2011] at http://www.wordfrequency.info.

Jones, Karen Sparck, "A statistical interpretation of term specify and its application in retrieval," Journal of Documentation, 1972.

Lin, Chin-Yew and Hovy, Eduard, "Identifying Topics by Position," 1997.

Markoff, John, "A Fight to Win the Future: Computers vs. Humans," The New York Times, Feb. 14, 2011.

Medelyan, Olena, "Human-competitive automatic topic indexing," Department of Computer Science, The University of Waikato, Hamilton, New Zealand: s.n., Ph.D. Thesis, 2009.

Milne, David, "An Open-Source Toolkit for Mining Wikipedia," Proceedings of the 2009 New Zealand Computer Science Research Student Conference, 2009.

Milne, David, "Computing Semantic Relatedness using Wikipedia Link Structure," Proceedings of the 2007 New Zealand Computer Science Research Student Conference, 2007.

Morrison, Donald R., "PATRICIA—Practical Algorithm to Retrieve Information Coded in Alphanumeric," Journal of the Association for Computing Machinery, 15, No. 4 (Oct. 1968).

Page, Lawrence, Brin, Sergey, Motwani, Rajeev, and Winograd, Terry "The PageRank Citation Ranking: Bringing Order to the Web," Stanford InfoLab, 1999.

Schönhofen, Peter, "Identifying document topics using the Wikipedia category network," Proceedings of the 2006 IEEE/WIC/ACM International Conference on Web Intelligence, 2006.

"Measuring Semantic Relatedness with Information Content," Aug. 2012, Internal/Confidential.

Wikipedia contributors, "Chicago Bears," Wikipedia: The Free Encyclopedia, Wikimedia Foundation, Inc., accessible at http://en.wikipedia.org/wiki/Chicago_Bears (accessed Aug. 7, 2012).

Wikipedia contributors, "Qi," Wikipedia: The Free Encyclopedia, Wikimedia Foundation, Inc., accessible at http://en.wikipedia.org/wiki/QI (accessed Aug. 7, 2012).

Berners-Lee, T., The Semantic Web, *Scientific American*, 284, pp. 34-43, (2001).

Mariah Carey, Retrieved Aug. 4, 2012, from Wikipedia: (http://en.wikipedia.org/wiki/Mariah_Carey), (Accessed on Aug. 3, 2012).

Shannon, C. E., "A Mathematical Theory of Communication," *The Bell System Technical Journal*, V27, 379-423, (1948).

* cited by examiner

SYSTEM, METHOD AND COMPUTER PROGRAM PRODUCT FOR AUTOMATIC TOPIC IDENTIFICATION USING A HYPERTEXT CORPUS

CROSS-REFERENCE TO RELATED APPLICATIONS

This application is a continuation-in-part (CIP) of U.S. patent application Ser. No. 13/607,639, to Szucs, et al., entitled "SYSTEM, METHOD AND COMPUTER PROGRAM PRODUCT FOR AUTOMATIC TOPIC IDENTIFICATION USING A HYPERTEXT CORPUS" filed Sep. 7, 2012, which is related to, and claims the benefit under 35 USC Section 119 (e) of U.S. Provisional Patent Application Ser. No. 61/532,094, confirmation no. 5558, filed Sep. 7, 2011, to Szucs et al., entitled "SYSTEM, METHOD AND COMPUTER PROGRAM PRODUCT FOR AUTOMATIC TOPIC IDENTIFICATION USING A HYPERTEXT CORPUS," both of which are of common assignee to the claimed invention, and the contents of both of which are incorporated herein by reference in their entireties.

BACKGROUND OF THE INVENTION

1. Field of the Invention

The present invention relates to indexing and retrieving electronic documents. More particularly, it relates to systems and methods for identifying the topics of a document using data extracted from the World Wide Web, a hypermedia encyclopedia, or any other hypermedia database.

2. Related Art

Most current information retrieval systems, including Web search engines, index and search documents based on keywords rather than concepts. The term "bears" is a simple example of this distinction. If, as in most Web search engines and other information retrieval systems, capitalization is ignored, "bears" could refer to a variety of concepts: the family of mammals Ursidae, the Chicago Bears professional American football team, or players in the financial markets with a negative outlook. Such groups of terms with the same spelling but different meanings are referred to as homographs.

A deeper problem is the many concepts that occur in a document have some varying degrees of importance. A document about the history of American space exploration, for example, might reference President John F. Kennedy's speech in 1962 committing the nation to the goal of a manned landing on the moon. However, the document is less about Rice University, where the speech was given, than it is about President Kennedy, and less about President Kennedy than it is about concepts like space exploration, NASA, specific programs like the Apollo program, and so forth. In other words, conventional solutions have failed to recognize and evaluate the relative importance of concepts appearing in a document.

Addressing these and other issues to identify the concepts that are the topics of a document is the problem of topic identification. Topic identification is an aspect of information retrieval, an interdisciplinary field of computer and information sciences relating to storing, locating, searching, and selecting relevant data on a given subject.

Topic identification has a number of valuable applications. Indexing and searching Web pages and other documents by topic, preferably in combination with conventional keyword-based indexing and searching, can improve the quality of search results. Topic identification directly supports automatically tagging documents in information management system or similar application and supports more intelligent filtering of information streams such as email messages, RSS and other syndication channels, and social media feeds.

Prior work in area of topic identification has a number of significant limitations. Some approaches focus on linguistic approaches to the problem, supported with little or no semantic knowledge of concepts. Many approaches are also domain-specific (for example, specialized for documents in a domain such law, medicine, or finance), language-dependent (for example, only capable of processing documents in the English document), and require on-going training and tuning.

Accordingly, an improved system and method for identifying the concepts that are the topics of a document is highly desirable.

What is needed is an improved method of identifying a topic of a document that overcomes shortcomings of conventional solutions.

SUMMARY OF VARIOUS EXEMPLARY EMBODIMENTS OF INVENTION

Various exemplary embodiments of a system, method and computer program product for providing a topic identification system, method and computer program product are set forth in detail herein.

According to one exemplary embodiment, a computer implemented method, system, and/or computer program product executable on one or more computer processors to cause a method of or for performing a workflow process on at least one content document may include, e.g., but may not be limited to, a) receiving, by one or more processors, the one or more document content; b) organizing, by the one or more processors, the one or more document content; c) discovering, by the at least one processor, one or more metadata relating to the one or more document content; and d) taking action, by the one or more processors, on the one or more document content, based on (a), (b), and/or (c).

According to one exemplary embodiment, the method may include where the one or more of (b) and/or (c) may include one or more of: i) analyzing, by the one or more processors, a topic of the one or more content documents; and/or ii) organizing, by the one or more processors, based on a topic of the at least one content document.

According to one exemplary embodiment, the method may include where (i) may include: a) identifying, by the one or more processors, one or more candidate topics in one or more received content documents of the one or more content documents based on one or more labels used in one or more corpora to link to and/or relate to the one or more candidate topics; b) evaluating, by the one or more processors, the one or more candidate topics of the one or more received content documents as a whole based on the one or more relationships between two or more of candidate topics from the one or more relationships in the at least one corpus; and c) weighting, by the one or more processors, the candidate content documents for relevance based on one or more of algorithmic analysis, and/or statistical analysis of the one or more relationships in the at least one corpus.

According to one exemplary embodiment, the method may include where the content document may include one or more of: an email; a message; a Simple Message System (SMS) message; a Multimedia Message System (MMS) message; a facsimile; a Really Simple Syndication (RSS) feed; an electronic communication; a social-networking communication, post, or comment; a social media communication, post, or comment; a tweet; an image; audio content; video content; text-based content; and/or optical character recognized (OCR) content.

According to another exemplary embodiment, a system, method, and/or computer program product may include, e.g., but not limited to, a method, which may include a) receiving, by one or more computer processor(s), one or more content documents; b) identifying and/or lexically scoring, by the one or more processors, one or more candidate topics in the one or more received content documents based on one or more labels used in at least one corpus to link to and/or relate to the one or more candidate topics; c) evaluating and/or semantically scoring, by the one or more processors, the one or more candidate topics of the one or more received documents based on one or more relationships between two or more of the candidate topics in the at least one corpus; and d) weighting, by the one or more processors, the candidate topics for relevance based on either or both algorithmic analysis and/or statistical analysis of the one or more hypertext link(s) in the at least one corpus.

According to one exemplary embodiment, the method may include where the at least one corpus may include one or more of: a source of at least one of lexical information or semantic information; a Wiki; a Wikipedia; an electronic encyclopedia; a World Wide Web in whole or in part; an enterprise intranet; a dictionary or lexicon; a semantic database; a professional database; a source of lexical and/or semantic information; a lexicon; a database; one or more online encyclopedias; a personalized corpus; a field specific corpus; or one or more online encyclopedias supplemented by one or more dictionaries.

According to one exemplary embodiment, the method may include where the one or more content documents may include one or more of: a textual document; a recognized speech; an electronic mail (email) message; an electronic communication; a text message; a Simple Message System (SMS) message; a multimedia message; a Multimedia Message System (MMS) message; a social media post or posting; a social network post or posting; an information stream; a Really Simple Syndication (RSS) feed; a syndicated content stream; an optically recognized characters (OCR) from content; hypermedia; audio content; video content; a web page; image content; textual content; an Internet content page; an intranet content page; another type of hypermedia document; a recognized speech converted document; an optically recognized character (OCR) content document from one or more of: a still image, a motion image; an electronic communication, which may include one or more of: electronic mail, text message, multimedia message, social media post or comment, social network post or comment, and/or forum posting and/or comment; and/or an information stream, which may include one or more of: a Really Simple Syndication (RSS) feed, an Atom feed, another feed, and/or syndicated content.

According to one exemplary embodiment, the method may include where the one or more labels may include one or more of: i) an anchor term in the at least one corpus; ii) a single word; iii) a phrase including a plurality of words; iv) a word or phrase in a lexicon; and/or v) an identifying name, word or phrase associated with an entity in a database, wherein the database may include at least one of a contact list, an inventory, a product database, another database).

According to one exemplary embodiment, the method may include where the identifying or lexically scoring of (b) above, may include one or more of: i) finding a plurality (two or more) of the one or more labels used in the at least one corpus, appearing in the one or more received documents in a lexical stage, ii) filtering the plurality of the one or more labels appearing in the one or more received documents; iii) calculating a score for each of the one or more labels appearing in the one or more received documents; and/or iv) identifying the one or more candidate topics based on the one or more topics to which a given label may refer in the at least one corpus.

According to one exemplary embodiment, the method may include where the (i) above may include: where the finding may include one or more of: 1) searching for one or more labels using case insensitive matching; 2) searching for the one or more labels using case sensitive matching; 3) searching for the label using a full text search algorithm; 4) indexing of keywords; 5) synonyms, 6) word stemming (e.g., quick, quicker, quickly) or conjugating (e.g., run, running, ran) 7) searching for the at least one label using a text search algorithm, which may include indexing, word stemming or conjugating, stop-word filtering (e.g., most frequently appearing words in language, such as, e.g., but not limited to, "the," "a," etc.), case folding (upper/lower), and/or pattern matching, and/or regular expression matching.

According to one exemplary embodiment, the method may include where the (ii) above may include where the filtering may include: excluding based on criteria, which may include i) excluding a most commonly used words of a given language, or ii) another exclusion.

According to one exemplary embodiment, the method may include where the (iii) above may include: where the calculating may include one or more of: 1) counting a number of occurrences of the at least one label in the at least one document; or 2) adjusting the calculated score of a given one of the at least one label based on the frequency of occurrence of the given one of the at least one label in a given language.

According to one exemplary embodiment, the method may include where the (iv) above may include: where the identifying may include one or more of: 1) selecting at least one candidate topic in the at least one corpus to which a given label refers; and/or 2) calculating a score for each the at least one candidate topic from at least one factor, wherein the calculating the score based on the one or more factors may include one or more of: i) calculating the score based on a calculated score for the at least one label associated with the at least one candidate topic; and/or ii) calculating the score based on a probability that a given label refers to a given topic in the at least one corpus.

According to one exemplary embodiment, the method may include where the evaluating and/or semantically scoring of the (c) above may include: where the one or more relationships may include being based on one or more of: at least one link, at least one hypertext link, at least one link in a database, at least one link in a semantic database, at least one relationship in a relational database, at least one relationship in a social network, at least one relationship between data elements, and/or one or more other relationships.

According to one exemplary embodiment, the method may include where the evaluating and/or semantically scoring of the (c) above may include: where the semantically scoring may include one or more of: i) adjusting the score based on presence of a relationship between the at least two candidate topics; ii) adjusting the score based on a weighted strength of a relationship between the at least two candidate topics; or iii) adjusting the score based on algorithmic analysis or statistical analysis of the relatedness between the at least two candidate topics.

According to one exemplary embodiment, the method may include where the (d) above may include: where the algorithmic analysis may include one or more of: i) a page ranking relevancy analysis; and/or ii) a link analysis algorithm (an algorithm for evaluating relative importance of at least two of the at least one candidate topics in the at least one corpus); and where the statistical analysis may include one or more of: i) vector space models; or ii) probabilistic models.

According to one exemplary embodiment, the method may include where the (c) (iii) may include: where the algorithmic analysis may include one or more of: 1) evaluating, by the one or more computer processors, relatedness between a plurality of topics in a hypermedia database; 2) evaluating, by the one or more computer processors, the relatedness between a plurality of, e.g., but not limited to, adjacent vertices in a graph representation of a hypermedia database; 3) evaluating, by the one or more computer processors, the relatedness between a plurality of, e.g., but not limited to, adjacent vertices based on the number of other vertices to which the plurality of vertices are coupled (directed or indirectly) and/or connected (directly or indirectly); 4) evaluating, by the one or more computer processor(s), the information content of an edge in a graph; where the information content may include one or more of: i) self-information; ii) surprisal; iii) other measures of information content based on information theory; and/or 5) evaluating, by the one or more computer processor(s), the relatedness between a plurality of non-adjacent vertices; wherein the evaluating of (5) may include one or more of: i) finding a path between the plurality of two non-adjacent vertices; and/or ii) incorporating a cost function into the path-finding of (i) process based on (2), (3), or (4).

According to an exemplary embodiment, self-information may include a measure of information content associated with an outcome of a random variable. In information theory, information is often treated at a very high-level of abstraction as a random function. As an example, each flip of a fair coin has a self-information of one bit: the outcome is either heads or tails. A toss of a six-sided die has 2.585 bits of information, calculated as $\log_2(6)$. According to an exemplary embodiment, self-information may be used to measure information content of a vertex in a graph, treating the graph's incident edges as a random function. Self-information has also been called surprisal, as self-information represents the "surprise" of seeing the outcome (a highly improbable outcome is very surprising).

According to yet another exemplary embodiment, a system may include one or more memories; and one or more processors coupled to the one or more memories, the one or more processors may be adapted to: receive at least one content document; identify and/or lexically score at least one candidate topic in the at least one received content document based on at least one label used in at least one corpus to link to or relate to the at least one candidate topic; evaluate and/or semantically score the at least one candidate topic of the at least one received document based on at least one relationship between at least two of the at least one candidate topics in the at least one corpus; and weight the one or more candidate topics for relevance based on either or a combination of algorithmic analysis and/or statistical analysis of the at least one hypertext link in the at least one corpus.

According to yet another exemplary embodiment, a non-transitory computer program product embodied on a computer readable medium, the computer program product may include program logic, which when executed on one or more computer processor(s) may perform a method, which may include: a) receiving, by one or more computer processor(s), one or more content documents; b) identifying and/or lexically scoring, by the one or more processors, one or more candidate topics in the one or more received content document based on one or more labels used in at least one corpus to link to and/or relate to the one or more candidate topics; c) evaluating and/or semantically scoring, by the one or more processor(s), the one or more candidate topics of the one or more received documents based on the one or more relationship(s) between two (or a plurality) of the one or more candidate topics in the at least one corpus; and d) weighting, by the one or more processor(s), the one or more candidate topics for relevance based on algorithmic analysis or statistical analysis of the one or more hypertext link(s) in the at least one corpus.

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EXEMPLARY EMBODIMENTS OF THE INVENTION

Various exemplary embodiments of the invention are discussed in detail below. While specific exemplary embodiments are discussed, it should be understood that this is done for illustration purposes only. Exemplary means example for purposes of this application, and various embodiments need not include all features as described herein. A person skilled in the relevant art will recognize that other components and configurations can be used without parting from the spirit and scope of the invention.

Overview of Exemplary Embodiments

Figure 1A:
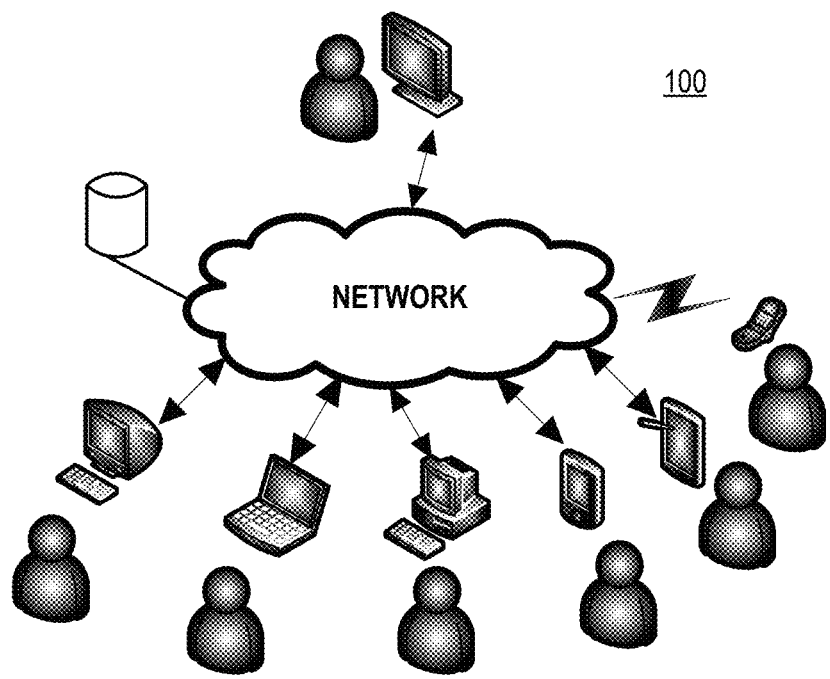
FIG. 1A depicts an exemplary view of an exemplary embodiment of an exemplary heterogeneous client device environment coupled to an exemplary network system adapted to provide an exemplary topic identification system architecture environment illustrating a plurality of computing and communication devices coupled together in an exemplary distributed networked system architecture, according to an exemplary embodiment.

FIG. 1A depicts an exemplary view of an exemplary embodiment of an exemplary heterogeneous client device environment coupled to an exemplary network system adapted to provide an exemplary network-based topic identification and/or collection, organization, discovery and/or acting (CODA) service provider system exemplary hardware system architecture environment including an exemplary plurality of computing and/or communication devices coupled together via an exemplary network 104 in an exemplary, but nonlimiting, distributed networked system architecture 100, according to an exemplary embodiment.

An exemplary computer system platform executing an exemplary software application program, which may reside, in an exemplary embodiment, on a user's client computing device 102, and/or on a server in interactive communication with the user's client computing device in a client/server, hierarchical, terminal server, or peer-to-peer fashion, may include, but is not limited to, a computing or communications device, desktop/laptop computers, tablet computers, telephony, smart-phone, mobile device, mobile phone, wireless device, tablet, personal digital assistant (PDA), handheld and the like, which may, in an exemplary embodiment, be the device capable of providing user display or other output of identified topics and/or other services such as, e.g., but not limited to, CODA and/or other services, and may receive user interactive selections via any of various well-known input devices, for acting upon collected, organized, and discovered topics of content received by users, and to be acted upon via the user's and/or the service providers computing devices. According to an exemplary embodiment, various versions of the exemplary software program, which may be an applet, a standalone application program, a browser based user interface, a Java applet, among various other embodiments as will be apparent to those skilled in the art, and as discussed further below with reference to FIGS. 1A-11, according to various exemplary embodiments. In an exemplary embodiment, browser based interactive graphical user interfaces, and/or an application, and/or applet, such as a toolbar, or browser based toolbar, etc., may be provided. In another exemplary embodiment, the toolbar may be an applet, or other application program that may be provided in any of various well-known ways, such as, e.g., but not limited to, an Internet browser-based toolbar, a Java applet, an Android application, a Windows 7 or Windows 8, etc. application program, an iPod, iPhone, or iPad application, a Mac OS X application, an iOS application, or the like, etc.

Figure 1B:
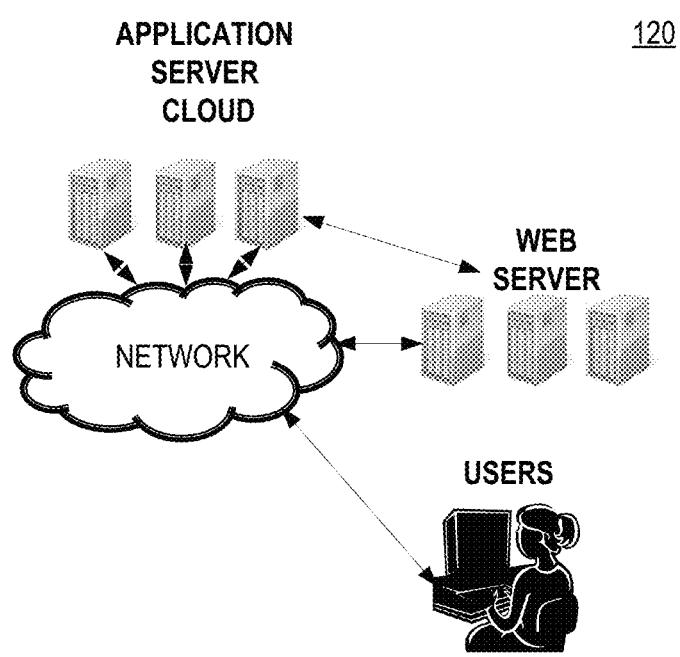
FIG. 1B depicts an exemplary embodiment of an exemplary topic identification system architecture high level diagram, according to an exemplary embodiment coupled together by an exemplary cloud-based architecture network, according to an exemplary embodiment.

FIG. 1B depicts an exemplary embodiment of a network-based promotion system, system architecture high level diagram 120, according to an exemplary embodiment coupled together by an exemplary cloud-based topology system architecture network, according to an exemplary embodiment.

According to an exemplary embodiment an exemplary cloud/network system and software, or a remote client server topology, a World Wide Web based (WWW) Internet browser based application, or the like application may be provided. Users as shown in diagram 120 may access applications, in an exemplary embodiment via a network illustrated by the cloud, which may include, for example web servers such as, e.g., but not limited to, domain name system (DNS) servers capable of domain name resolution, and hypertext markup language (HTML), Java applications, and/or extensible markup language (XML) implemented interactive applications, as a service offering may be implemented, and may allow, e.g., but not limited to, interactive client to remote server device interaction in well-known matters via various well-known network protocols such as the internet protocol (IP) and the transmission control protocol (TCP), as well as any well-known network stack implementing the various communications layers of the OSI model for standard communication between two or more computing devices. According to an exemplary embodiment, many exemplary commercial cloud service providers may be used to host an application, if not a separate server one may use a cloud based offering such as, e.g., but not limited to, Amazon, Rackspace, Microsoft, and/or many others as will be apparent to those skilled in the art, offering such capabilities, or alternatively application service providers (ASPs), software as a service (SaaS) providers, etc.

Figure 1C:
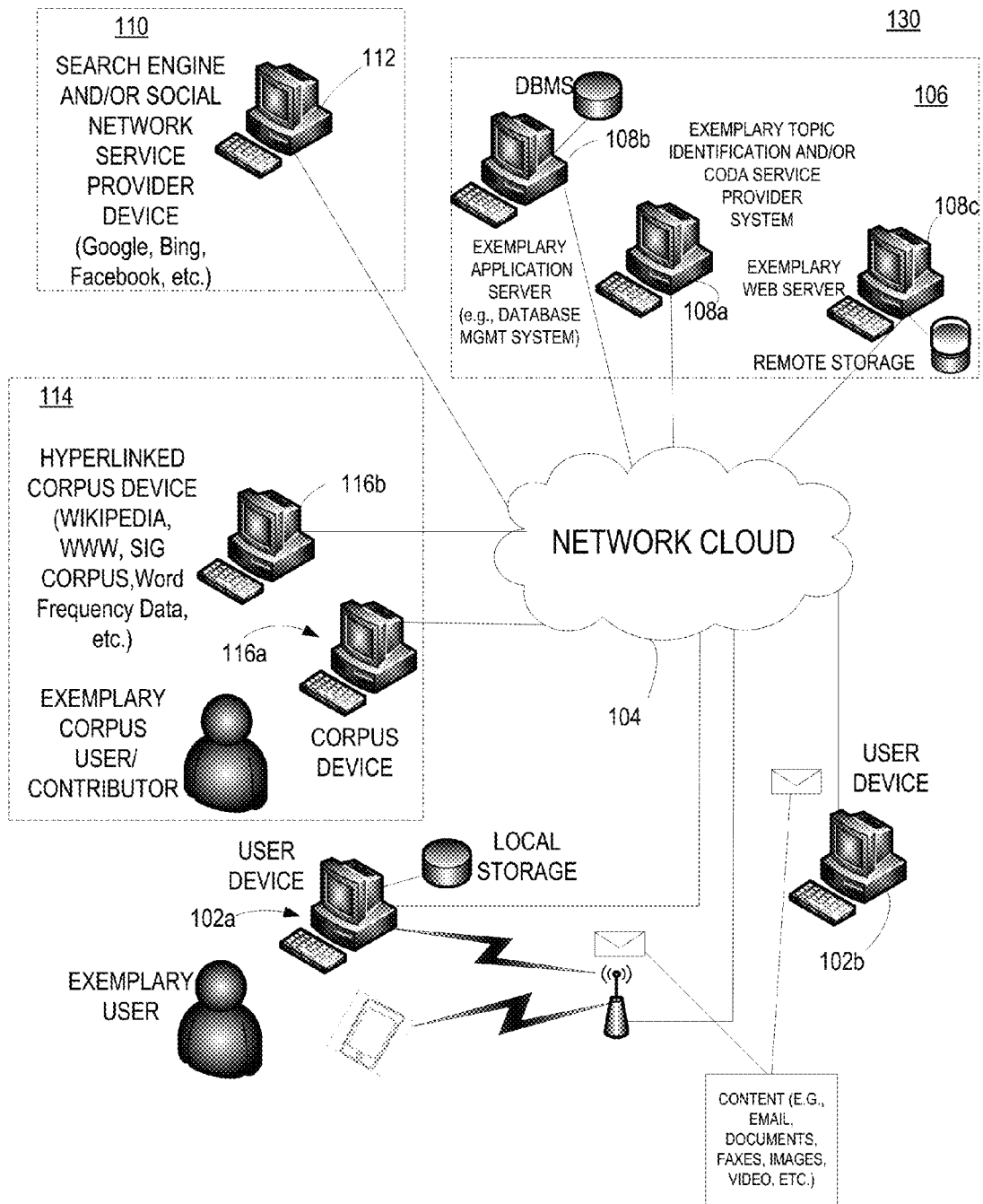
FIG. 1C depicts an exemplary embodiment of an exemplary system illustrating an exemplary distributed network environment as may be used in an exemplary topic identification system environment.

FIG. 1C depicts an exemplary embodiment of an exemplary system 130 illustrating an exemplary distributed network environment, according to an exemplary embodiment. Diagram 130 of FIG. 1C illustrates exemplary user devices 102a, 102b (collectively referred to as 102), e.g., a personal computer (PC), or smartphone, among other devices as illustrated in FIG. 1A above, etc.) by which a user may access a network 104 to gain access to other network resources, service providers' 106, 110, 114 applications as well as to communicate with other users' devices 102 according to an exemplary embodiment. According to an exemplary embodiment, the user devices 102 may communicate via network 104 to other user devices 102 via any of various electronic communications applications and/or protocols, such as, e.g., but not limited to, electronic mail systems, facsimile, Simple Message System (SMS), Really Simple Syndication (RSS), Multimedia Message System (MMS), TWITTER, FACEBOOK, GOOGLE+, TUMBLR, MYSPACE, etc. and/or a social network or other service providers such as, e.g., but not limited to, a search engine and/or social network service provider 110 as illustrated including search engine and/or social network service provider device 112 (of e.g., but not limited to, GOOGLE, BING, FACEBOOK, TWITTER, etc.) also coupled to network 104, according to an exemplary embodiment. According to various exemplary embodiments, the user devices 102 may also access an exemplary topic identification and/or collection, organization, discovery and act (CODA) service provider 106, which as illustrated, may include service provider user devices 108*a*, 108*b*, 108*c*, as may be used to handle, e.g., but not limited to, topic identification, filtering, query receipt, processing and response processing, etc. As shown, the service provider 106 may include various servers, such as, e.g., but not limited to, web servers 108*a*, application servers 108*b* (such as, e.g., but not limited to, a database management system (DBMS)), remote storage and/or archive device servers 108*c*, etc. As shown, the user devices 102 may access the exemplary topic identification and/or CODA service provider systems 106, via, e.g., but not limited to, a browser-based Internet application, via exemplary web server 108*a*, which may perform such functions as providing load balancing and/or security, and/or a firewall for the service provider 106, as well as may then serve access to one or more application servers 108*b*, 108*c*, such as, e.g., but not limited to, may include a database management system such as, e.g., but not limited to, a relational database, or other application software system, according to an exemplary embodiment. Further, as illustrated, other devices of users such as, e.g., but not limited to, service provider devices, or other search engine and/or social network based service provider devices 112. Exemplary topic identification and/or CODA service provider devices 108 may access various data content provider's content such as, e.g., but not limited to, hyperlinked corpus data provider devices, 116*a*, 116*b* (collectively 116), other data providers may include term frequency count such as word frequency data from the Corpus of Contemporary American English (COCA), (wordfrequency.info), and/or other data, as may be used by the topic identification and/or CODA service provider in delivering service to users 102. According to an exemplary embodiment, users 102 may send and/or receive communications including content such as, e.g., but not limited to, documents, emails, communications, microblogs, RSS feeds, SMS, MMS, and/or other content (e.g., text, audio, video, fax, screen shots, image, etc.), etc., and according to an exemplary embodiment, the service provider 106 may provide an application and/or applet that may assist in collecting, organizing, and discovering the communications' topical content, and may initiate actions, or recommend the user interactively initiate actions such as, e.g., but not limited to, storing an email on a given topic in a location where the user has previously stored other email with the same topic, etc.

Figure 1D:
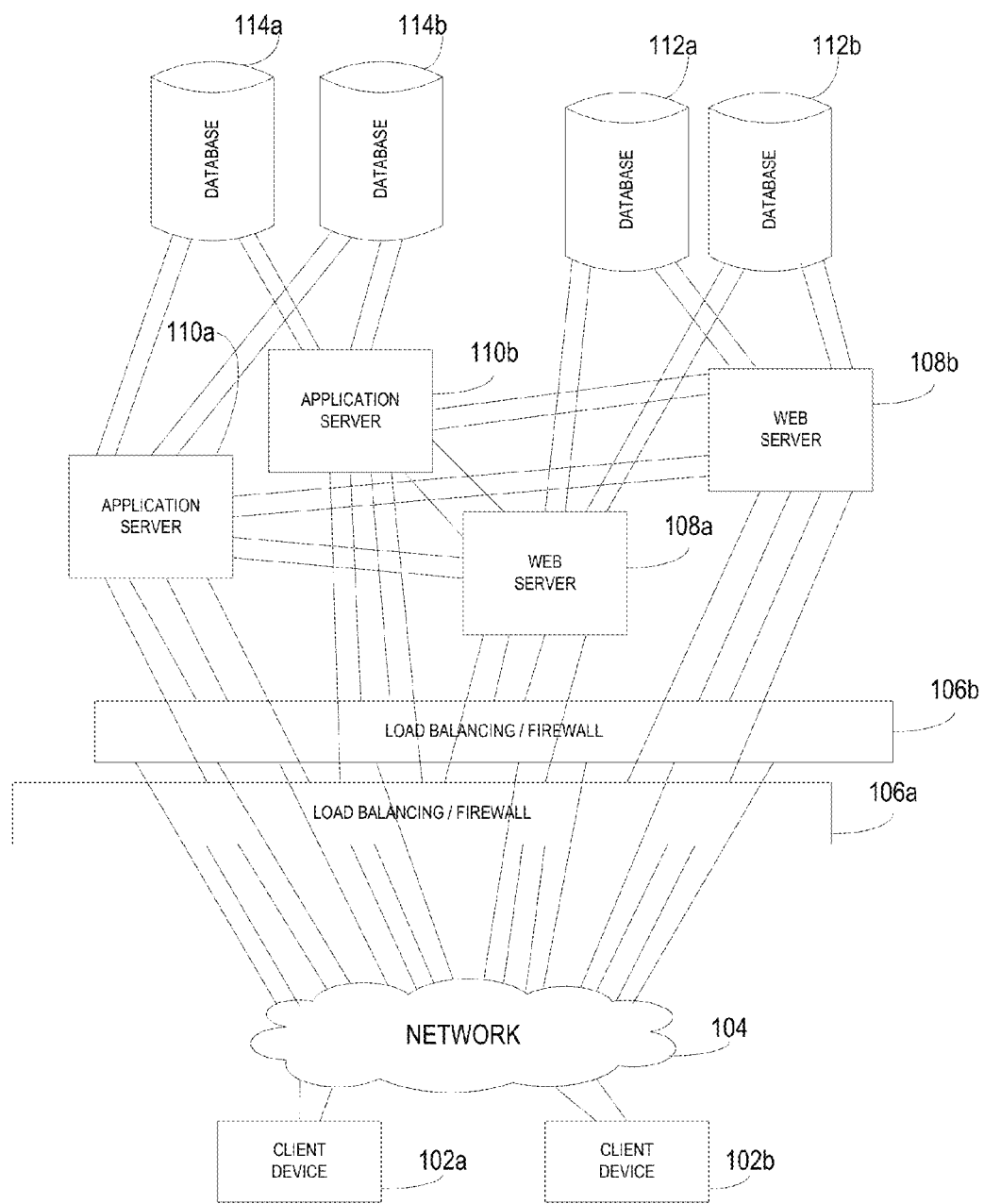
FIG. 1D depicts an exemplary embodiment of an exemplary system as may be used in an exemplary topic identification system environment.

FIG. 1D depicts an exemplary embodiment of diagram 140 of an exemplary system illustrating an exemplary network environment. FIG. 1D illustrates an exemplary overview of an exemplary system as may be used in an exemplary environment according to various exemplary embodiments of the present invention. FIG. 1 depicts an exemplary embodiment of a high-level system block diagram 140 that can be used to provide an exemplary system for providing an exemplary topic identification search query and/or response engine according to an exemplary embodiment of the present invention.

The high-level system block diagram 140 of FIG. 1D may include, in an exemplary embodiment, users interacting with exemplary browsers on client devices 102, respectively. Browsers can be, e.g., but not limited to, application software programs executing on computer workstations or other computer processor based devices 102 (including mobile devices such as, e.g., but not limited to, communication devices, phones, smartphones, tablets, and/or computer tablets), which may be coupled via a network 104 (in wireline and/or wireless fashion) to other devices, as shown, in an exemplary embodiment. Workstations 102 can be coupled via a network 104 such as, e.g., but not limited to, an internet, an intranet, or another type of network. In an exemplary embodiment network 104 may include the global Internet. Network 104 may provide access for client devices 102 to gain access to, e.g., but not limited to, one or more application servers 110*a*, 110*b* (collectively 110), such as, e.g., but not limited to, a database management system (DBMS). Although a client-server topology is discussed any of various other well-known types of communications topologies may also be used such as, e.g., but not limited to, point-to-point, peer-to-peer, cloud-based, software as a service (SaaS), browser-based, hierarchical, distributed, and/or centralized, etc. The application server 110 can manage one or more databases (collectively 112). In an exemplary embodiment, the application server 120 can access an exemplary database(s) 114 having a plurality of data records, where in an exemplary embodiment, each data record may have one or more fields, etc. It will be apparent to those skilled in the art, that each database 112, 114 can be part of a larger database, or could be broken into a plurality of separate subdatabases. In an exemplary embodiment of the present invention, search results can include a plurality of records obtained from the database 112, 114 that meet search criteria included in a search query. Network 104 may be coupled to any of various well-known components such as, e.g., but not limited to, one or more load balancing devices or firewall devices 106*a*, 106*b* (collectively 106), web server(s) 108, application server(s) 110, routers, gateways, physical layer devices, data link layer devices, and/or network layer devices, etc.

As illustrated, web servers 108 and/or application servers 110 may be coupled to one another via one or more network(s) 104. According to an exemplary embodiment, exemplary inter-device redundant couplings may be provided using any of various well-known techniques. Although network 104 is shown, in an exemplary embodiment, as being downstream of load balancing devices 106, it is also possible to have a network upstream of load balancing devices 104, coupling, e.g., but not limited to, application server(s) 110, web server(s) 108, and/or database(s) 112, 114, as well as other client or other server devices (not shown), local and/or remote from the depicted exemplary devices, etc. Exemplary client devices 102 are depicted downstream over an exemplary network(s) 104 from the server devices, but could easily be elsewhere in the network topology, e.g., inside, or outside a firewall. It is also important to note that network 104 is represented in cloud metaphor schematic, but various well-known network devices including various well-known star-based, bus-based, or other well-known network topologies may also be represented by exemplary network(s) 104.

A user interacting with a browser on workstation 102*a* can access the database 114*a*, in an exemplary embodiment by traversing several intervening networks using well-known communications protocols such as, e.g., but not limited to, transmission control protocol/internet protocol (TCP/IP). Specifically, in an exemplary embodiment, the workstation 102a can be coupled via exemplary network(s) 104 including, e.g., but not limited to, a public and/or private network, and/or the global Internet to any of various exemplary website system(s), in this exemplary case, web server(s) 108a, 108b (collectively 108), which may include any of various hosting systems such as, e.g., but not limited to, a domain system, a domain name system (DNS), a domain controller system, etc. Website or web server system 108 in an exemplary embodiment can be, e.g., but not limited to, the Venio Labs website available from Venio, Inc. of Woodbridge, Va. USA. The website system 110 can include, in an exemplary embodiment, an exemplary firewall 106 coupled to, or in addition to, or integrated with, a load balancer 106a, 106b (which could alternatively run on a general purpose computer such as, e.g., web server 108a, 108b, etc. Load balancer 106 can be coupled to an exemplary web server 108a, and 108b. Web servers 108a, 108b can be mesh coupled to one or more application servers 110a, 110b, via hardware and/or software system solutions, according to an exemplary embodiment, or via another network 104 (not shown). Each server 108, 110, may include, e.g., but not limited to, or be coupled to, one or more database(s) 112, 114. Web server(s) 108 in an exemplary embodiment, can perform load balancing functions by transferring user application requests/queries to one or more of the application servers 110a, 110b. Results of the exemplary requests and/or queries from database 114 can be transferred from application servers 110 through web servers 108 through the network 104 to workstation 102.

Figure 1E:
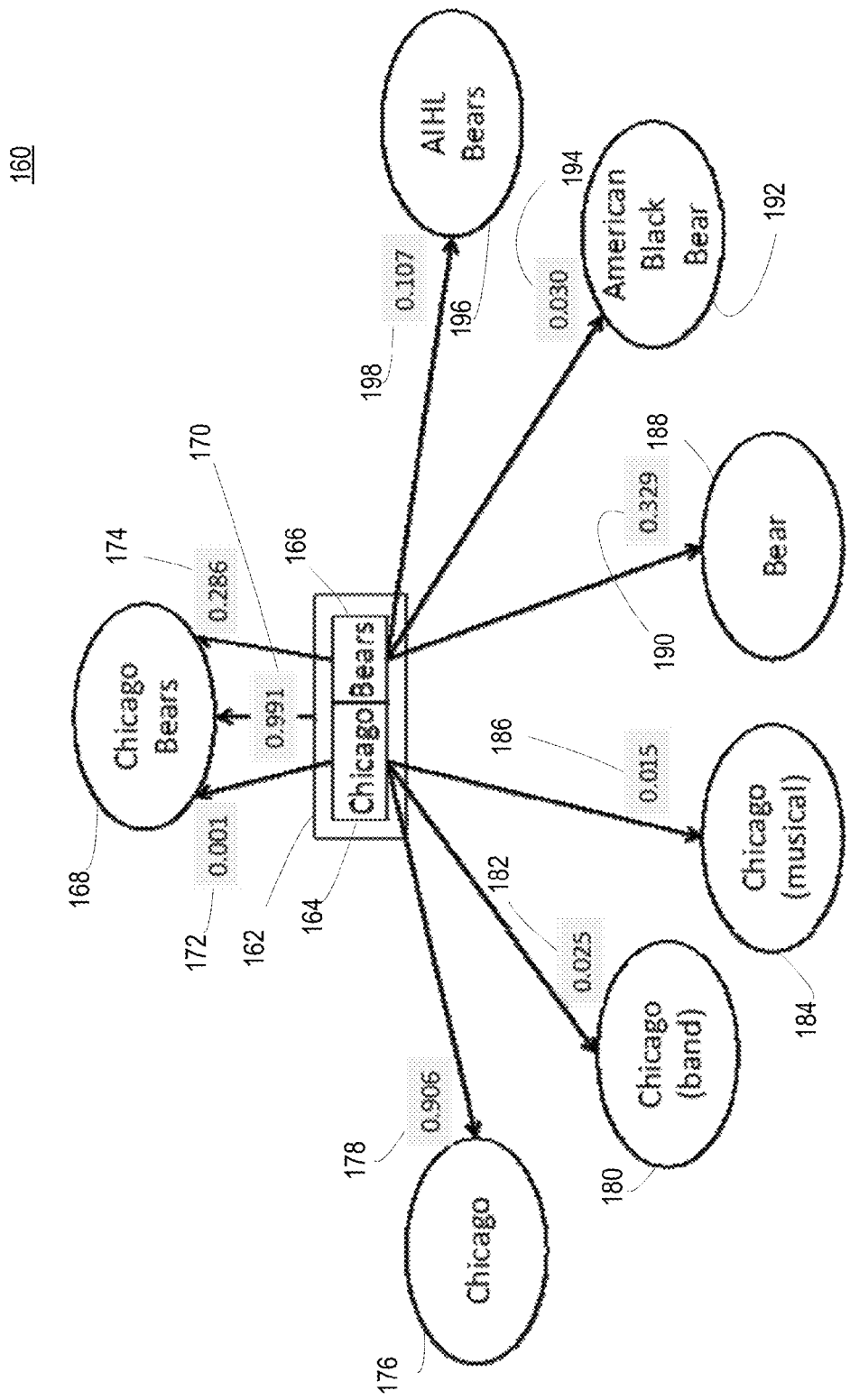
FIG. 1E depicts an exemplary embodiment of an exemplary lexical scoring system as may be used in an exemplary embodiment of an exemplary topic identification system environment.

FIG. 1E depicts an exemplary embodiment of an exemplary diagram 160 illustrating an exemplary topic and related topics as extracted from an exemplary document and illustrating exemplary links from a label to another related label, illustrating an exemplary embodiment of an exemplary lexical stage application program for creating a novel and non-obvious topic identifier, according to an exemplary embodiment.

Thema: Automatically Identifying Topics and/or Categories Using an Exemplary Hypertext Corpus Introduction According to an exemplary embodiment, lexical and semantic data extracted from at least one suitable hypertext corpus, such as, e.g., but not limited to, online encyclopedia Wikipedia, can be used by an electronic computational device to automatically identify a topic of a document or other block of text. The method according to an exemplary embodiment, may include a processor-executed program logic algorithm, system, method and/or nontransitory computer program product to perform a task, which may include, in an exemplary embodiment, a general-purpose, domain-independent, language-independent process computing and/or storing results comparable in accuracy to human classification, however, fully machine automated. The machine implemented algorithm, system, method, and/or computer program product is also adaptable to the use of other corpora, including large subsets of, or the entirety of, the World Wide Web (WWW or Web). The algorithm may be adapted to be executed by at least one computer system comprising at least one processor, and at least one memory.

Topic identification is a fundamental problem in the field of information retrieval (IR). A goal of topic identification is to analyze the contents of a document, such as a Web page, to determine its topics. Used alone or in combination with other strategies, topic identification can support a browsing (as opposed to searching) paradigm for information retrieval, improve automatic routing and filtering capabilities such as "push" services, improve precision, recall, and/or other key IR metrics.

One of the important problems in topic identification and in other areas of information retrieval is the disambiguation of homographs, which are words that have the same spelling but have different meanings. For example, the first 10 results of a Google Web Search query for "bears" returns four results about the Chicago Bears professional football team and six results about the family of mammals Urisidae. The term "bears" can also have other meanings besides the two represented in the top results of this search. For example, in financial markets, a "bear" is someone who anticipates downward trends in the prices of securities or commodities.

Other examples of such homographs include the "Paris Hilton" problem referenced in media coverage by Markoff in 2011, of IBM's Watson question answering project, "does Paris Hilton refer to the celebrity or to a Hilton hotel in Paris, France?" and Applicants' own "Chevy Chase" problem, "does Chevy Chase refer to the actor or to the city of Chevy Chase, Maryland.?" (See Markoff, John, "A Fight to Win the Future: Computers vs. Humans," *The New York Times*, Feb. 14, 2011.) Note that the Chevy Chase problem is slightly more difficult than the Paris Hilton problem because there actually is a city named Chevy Chase in Maryland, whereas there is not actually a Paris Hilton hotel, only Hilton hotels (with various names) in Paris, France.

A deeper problem is that a document of any significant length or complexity will reference many distinct topics. For example, a news article about the Chicago Bears football team may reference the National Football League (NFL), the National Football Conference (NFC), the Northern Division of the NFC, competing teams such as the Green Bay Packers, individual players and coaches, injuries, idioms like the legend of the Headless Horseman from *The Legend of Sleepy Hollow* in American folklore, and many other topics. A human reader would consider such an article to be about the Chicago Bears American football team and, to a lesser extent, about related concepts like the NFL, the NFC, the NFC North, other NFL teams, and the players and coaches. Such an article, however, would not be about injuries or the Headless Horseman legend in any meaningful way.

Applicant's algorithm, system, method, and/or computer program product addresses both of these problems, as well as other issues in the field of topic identification, to produce results that are very competitive with human classification of a document, according to an exemplary embodiment. The algorithm, system, method, and/or computer program product, according to an exemplary embodiment is language-independent, domain-independent, and has successfully classified documents in a wide variety of domains including, e.g., but not limited to, science and technology, the law (e.g., litigation support, document review, etc.), medicine, music, and professional sports, etc., according to an exemplary embodiment.

In Applicants' experiments, Applicants used the English version of Wikipedia as Applicants' at least one hypertext corpus, according to an exemplary embodiment, supplemented by word frequency data from the Corpus of Contemporary American English (see Davies, Mark, "Word frequency data from the Corpus of Contemporary American English (COCA)" [Online], 2011, [Cited and last Accessed: Aug. 27, 2011] at wordfrequency.info.). The algorithm, according to an exemplary embodiment, is adaptable to other general-purpose or domain-specific corpora, including large subsets of, or the entirety of, the World Wide Web as a whole.

In Applicants' work, according to an exemplary embodiment, Applicants integrated and extended earlier work by Olena Medelyan (see Medelyan, Olena, "Human-competitive automatic topic indexing," Department of Computer Science, The University of Waikato, Hamilton, New Zealand: s.n., Ph.D. Thesis, 2009), David Milne (see Milne, David, "An Open-Source Toolkit for Mining Wikipedia," *Proceedings of the* 2009 *New Zealand Computer Science Research Student Conference*, 2009, and Milne, David, "Computing Semantic Relatedness using Wikipedia Link Structure," *Proceedings of the* 2007 *New Zealand Computer Science Research Student Conference*, 2007), Peter Schönhofen (see Schönhofen, Peter, "Identifying document topics using the Wikipedia category network," *Proceedings of the* 2006 *IEEE/WIC/ACM International Conference on Web Intelligence*, 2006), and others as cited in this paper's references including the following, copies of all of which are included herewith and in the accompanying appendix, and are incorporated herein by reference in their entirety:

Adamic, Lada A., and Huberman, Bernardo A., "Zipfs Law and the Internet," Glottometrics, 2002, Vol. 3.

Chakrabarti, Soumen, Dom, Byron and Indyk, Piotr, "Enhanced Hypertext Categorization Using Hyperlinks," 1998.

Davies, Mark, "Word frequency data from the Corpus of Contemporary American English (COCA)" [Online], 2011, [Cited and last Accessed: Aug. 27, 2011] at wordfrequency.info.

Jones, Karen Sparck, "A statistical interpretation of term specify and its application in retrieval," *Journal of Documentation*, 1972.

Lin, Chin-Yew and Hovy, Eduard, "Identifying Topics by Position," 1997.

Markoff, John, "A Fight to Win the Future: Computers vs. Humans," *The New York Times*, Feb. 14, 2011.

Medelyan, Olena, "Human-competitive automatic topic indexing," Department of Computer Science, The University of Waikato, Hamilton, New Zealand: s.n., Ph.D. Thesis, 2009.

Milne, David, "An Open-Source Toolkit for Mining Wikipedia," *Proceedings of the* 2009 *New Zealand Computer Science Research Student Conference*, 2009.

Milne, David, "Computing Semantic Relatedness using Wikipedia Link Structure," *Proceedings of the* 2007 *New Zealand Computer Science Research Student Conference*, 2007.

Morrison, Donald R., "PATRICIA—Practical Algorithm to Retrieve Information Coded in Alphanumeric," *Journal of the Association for Computing Machinery*, 15, no. 4 (October 1968).

Page, Lawrence, Brin, Sergey, Motwani, Rajeev, and Winograd, Terry "The Page Rank Citation Ranking. Bringing Order to the Web," Stanford InfoLab, 1999.

Schönhofen, Peter, "Identifying document topics using the Wikipedia category network," *Proceedings of the* 2006 *IEEE/WIC/ACM International Conference on Web Intelligence*, 2006.

"Measuring Semantic Relatedness with Information Content," August 2012, Internal/Confidential.

Wikipedia contributors, "Chicago Bears," Wikipedia: The Free Encyclopedia, Wikimedia Foundation, Inc., accessible at en.wkipedia.org/wiki/Chicago_Bears (accessed Aug. 7, 2012).

Wikipedia contributors, "QI," Wikipedia: The Free Encyclopedia, Wikimedia Foundation, Inc., accessible at en.wikipedia.org/wiki/QI (accessed Aug. 7, 2012).

According to an exemplary embodiment, an exemplary method, system, and/or nontransitory computer program product may use lexical and semantic data extracted from a hypertext corpus along with word frequency data for the language of interest.

Previous work in (see Schönhofen, Peter, "Identifying document topics using the Wikipedia category network," *Proceedings of the* 2006 *IEEE/WIC/ACM International Conference on Web Intelligence*, 2006), (see Milne, David, "Computing Semantic Relatedness using Wikipedia Link Structure," *Proceedings of the* 2007 *New Zealand Computer Science Research Student Conference*, 2007), (see Medelyan, Olena, "Human-competitive automatic topic indexing," Department of Computer Science, The University of Waikato, Hamilton, New Zealand: s.n., Ph.D. Thesis, 2009), and others highlighted the value of Wikipedia in natural language processing, information retrieval, and related disciplines. In an exemplary embodiment of Applicants' work, most of the lexical and semantic data used by Applicants' algorithm was extracted from the English version of Wikipedia, specifically from a snapshot dated Mar. 6, 2009 that Milne extracted, processed, and published in (Milne, David, "An Open-Source Toolkit for Mining Wikipedia," *Proceedings of the* 2009 *New Zealand Computer Science Research Student Conference*, 2009). Wikipedia has several salient characteristics that make it suitable as a data source for Applicants' work, according to an exemplary embodiment.

First, Wikipedia contains pages that can be considered authoritative for potential topics of interest, according to an exemplary embodiment. For example, the page at en.wikipedia.org/wiki/Chicago_Bears (see Wikipedia contributors, "Chicago Bears," Wikipedia: The Free Encyclopedia, Wikimedia Foundation, Inc., accessible at en.wikipedia.org/wiki/Chicago_Bears (accessed Aug. 7, 2012)) can be considered the authoritative page on the Chicago Bears. The World Wide Web as a whole, as well as most intranets and extranets, also have this characteristic, according to an exemplary embodiment. For example, wikimediafoundation.org can be considered the authoritative page about the Wikimedia Foundation, veniolabs.com can be considered the authoritative page about Applicants' organization Venio Labs of Venio, Inc. of Woodbridge, Va., USA, and apple.com/iphone can be considered the authoritative page about the Apple iPhone.

Second, Wikipedia is richly linked. The snapshot that was used by Applicants contains approximately 1.5 billion words in 2.8 million articles connected by 70.2 million links. This corresponds to a ratio of approximately 21 words to one link and 25 links per article. These metrics have been found empirically to be suitable for use with Applicants' algorithm. Domain-specific public wikis, such as those hosted by Wikia, and intranet/extranet wikis, such as, e.g., but not limited to, the US Intelligence Community's Intellipedia or the US Army's MilWiki, are also richly linked. In contrast, large collections of traditional (linear) documents would not be suitable corpora for this algorithm, according to one exemplary embodiment of the present invention, although the algorithm would be effective in indexing such documents by topic given a suitable corpus from which the necessary lexical and semantic data could be extracted.

Finally, Wikipedia generally anchors links from meaningful terms or phrases. For example, the first sentence of the aforementioned Wikipedia article (see Wikipedia contributors, "Chicago Bears," Wikipedia: The Free Encyclopedia, Wikimedia Foundation, Inc., accessible at en.wikipedia.org/wiki/Chicago_Bears (accessed Aug. 7, 2012)) about the Chicago Bears reads, "The Chicago Bears are a professional American football team (en.wikipedia.org/wiki/American_football) based in Chicago, Ill. (en.wikipedia.org/wiki/Chicago,_Illinois)." In that sentence, the phrase "American football" anchors a link to an authoritative page describing American football and the phrase "Chicago, Ill." anchors a link to an authoritative page about the Illinois city of Chicago. As Applicants describe later, these link anchors are important in resolving potentially ambiguous terms, according to an exemplary embodiment. The World Wide Web as a whole generally has this characteristic, as do richly linked intranets/extranets as previously defined.

Wikipedia and some other wikis include multiple types of pages, including article pages, category pages, redirect pages, and disambiguation pages. In Applicants' work with Wikipedia, Applicants only consider article pages to represent potential topics, according to an exemplary embodiment. According to an exemplary embodiment, this provides an excellent range of potential topics, since Wikipedia has article pages covering an immense range of topics, from mathematical theorems and scientific discoveries to fictional characters and professional sports teams.

Applicants, according to an exemplary embodiment, considered using category pages, as in (see Schönhofen, Peter, "Identifying document topics using the Wikipedia category network," *Proceedings of the* 2006 *IEEE/WIC/ACM International Conference on Web Intelligence,* 2006) and other work. Applicants found that, according to an exemplary embodiment, using category pages only would unnecessarily limit the potential topics that the algorithm would identify and also learned that nearly every meaningful topic that has a category page also has a corresponding article page. Also, note that the toolkit in (see Milne, David, "An Open-Source Toolkit for Mining Wikipedia," *Proceedings of the* 2009 *New Zealand Computer Science Research Student Conference,* 2009) with which Applicants reference data was extracted does use redirect pages as needed to resolve links, according to an exemplary embodiment.

Applicants' algorithm, according to an exemplary embodiment, may also utilize word frequency data for the language of interest. In Applicants' work, Applicants used the word frequency data for contemporary American English published by Mark Davies in (see Davies, Mark, "Word frequency data from the Corpus of Contemporary American English (COCA)" [Online], 2011, [Cited and last Accessed: Aug. 27, 2011] at wordfrequency.info).

Applicants' method, according to an exemplary embodiment, may include, e.g., but not limited to, the following elements:

1) Identifying potential candidate topics in the input document based on labels and/or anchor terms used in the corpus to link to that topic, according to an exemplary embodiment.

2) Determining or evaluating the topics of the input document as a whole using semantic relationships between concepts derived or scored from hypertext links in the corpus, according to an exemplary embodiment.

3) Weighting the candidate documents for relevance based on an exemplary algorithmic and/or statistical analysis of hypertext links or other relationships in the corpus, according to an exemplary embodiment.

Exemplary First Stage—Exemplary Lexical Stage—Exemplary Term Scoring

An exemplary first step, according to an exemplary embodiment, in the algorithm is to find the anchor terms, labels, and/or phrases from the hypertext corpus that may occur in the input document. The finding of anchor terms and/or phrases may be formally expressed as $T = A \cap d$, where A is the set of all anchor terms and phrases in the corpus, d is the input document, and T is the set of anchor terms and phrases which occur in the document, according to an exemplary embodiment.

For the sake of clarity, the phrase "anchor term(s)," or "label(s)," herein, should be understood to include both single words (e.g., "bears") and phrases (e.g., "Chicago Bears") throughout this document, according to an exemplary embodiment.

The search for anchor terms in the input document is performed using case-insensitive matching because it has been empirically determined that neither the casing of labels in the corpus (e.g., anchor terms in the corpus) (e.g, Wikipedia in Applicants' experiments) nor the casing of labels (e.g., anchor terms) in the input document is reliable. In early experiments, Applicants had excluded labels that did not contain any alphabetic characters (for example, a year like 2007) or consisted of, or included, only a single character in order to reduce noise and improve performance. However, this prevents the topic identifier from identifying some potentially relevant topics, such as the C programming language (single character) or the Colt Model 1911 pistol, which is commonly referred to as the "1911" (no alphabetic characters), etc., according to an exemplary embodiment.

According to an exemplary embodiment, the only filtering that Applicants may presently apply to the labels, according to an exemplary embodiment, may exclude the 500 most common words in the English language (see Davies, Mark, "Word frequency data from the Corpus of Contemporary American English (COCA)" [Online], 2011, [Cited and last Accessed: Aug. 27, 2011] at wordfrequency.info) from the set A of potential labels to mitigate a major source of noise in the algorithm, according to an exemplary embodiment.

In another exemplary embodiment, the input document is separated into tokens, which may include of one or more words, e.g., but not limited to, "The Baltimore Ravens defeated the New England Patriots to win the Super Bowl in 2013" where tokens are shown underlined. Filtering may then be applied by matching tokens with an exemplary list of words to be ignored (e.g., but not limited to "a", "an", "the", etc.), according to an exemplary embodiment.

According to an exemplary embodiment, terms may be weighted in part based upon the position of a term's occurrence within an input document. Essentially, terms occurring near the beginning or end of the document may be weighted more strongly than terms occurring in the middle of a document, because most well written documents may be implicitly or explicitly structured around an introduction, a body, and a conclusion, according to an exemplary embodiment. This weight may be calculated by, e.g., but not limited to, $$u = 1.0 - \frac{\sin\left(\frac{s}{t}\right)}{2},$$

where s is the starting offset of the match into the input document and t is the total length of the document, according to an exemplary embodiment.

According to an exemplary embodiment, the classic term frequency-inverse document frequency (TF-IDF) metric described in (see Jones, Karen Sparck, "A statistical interpretation of term specify and its application in retrieval,"

*Journal of Documentation,* 1972) may be calculated for each anchor term t in the set T of anchor terms found in the input document, according to an exemplary embodiment. The TF-IDF metric may be formally expressed as tf-idf(t,d)=tf(t,d)×idf(t), where tf(t,d) may simply be the number of occurrences of term t in the input document d, $$idf(t, d) = \log \frac{|D|}{|\{d : t \in d\}|}$$

where D is the corpus, |D| is the cardinality of (or total number of documents in) the corpus, and |{d: t∈d}| is the number of documents in the corpus in which term t occurs. If the term does not occur in the corpus idf(t,d) is calculated as if the term t had occurred in one document in the corpus (to avoid division by zero), and thus may be set to 1, according to an exemplary embodiment.

A single label or anchor term can refer to multiple concepts. Using an earlier example, the label or anchor term "bears" (especially when used in a case-insensitive manner, as in Applicants' algorithm) can refer to mammals of the family Ursidae, to the NFL team, or to various other concepts, each of which is a potential topic of the input document and is represented by a distinct page in the corpus, according to an exemplary embodiment.

Milne, David, "An Open-Source Toolkit for Mining Wikipedia," *Proceedings of the* 2009 *New Zealand Computer Science Research Student Conference,* 2009 includes a simple and effective example model for handling this by calculating the prior probability or proportion P(t,d) that a link anchored with term t that points to a given document d. For example, in the data set that Applicants used in Applicants' work, 46% of the links anchored by the term "bears" led to the Wikipedia article for the mammals, 33% of those links led to the Wikipedia article for the NFL team, and the remainder of those links led to articles about various other meanings of the term "bears." In order to emphasize the most common meanings of a given word or phrase, we may apply a logarithmic scaling function to the prior probability, according to an exemplary embodiment.

P'(t,x)=1+log$_{10}$(P(t,x)).  Equation 1: Logarithmic Scaling of Prior Probabilty For each label or anchor term t in the input document, a dimensionless linguistic or lexical score $L_x$ for the candidate document x in the corpus may be calculated by multiplying the number of occurrences of the label or anchor term t in the input document d, according to an exemplary embodiment. This calculation may be formally expressed as $L_x$=P'(t,x)×tf-idf(t,d). In this context, d is the input document, t is the label or anchor term, and x is the candidate document. P(t,x) and tf-idf(t,d) are as previously defined above, according to an exemplary embodiment. In another exemplary embodiment, where terms may be weighted, $L_x$ may be expressed as $L_x$=P'(t,x)×tf-idf(t,d)×(1+u) where u is the positional weight of a term as described in previous paragraphs.

$L_x$ is a cumulative score. For example, if two labels or anchor terms (for example, "Bears" and "Chicago Bears") that point to the same candidate document (for example, en.wikipedia.org/wiki/Chicago_Bears) are found in the input document, $L_x$ for that candidate document may be the sum of the scores for the two terms that referenced the input document, according to an exemplary embodiment.

FIG. 1E and Table 1, according to an exemplary embodiment shows a simplified example of lexical scoring or term scoring for the text fragment "Chicago Bears."

In Applicants' Wikipedia-derived data set, 90.6% of occurrences of the term "Chicago" as a link anchor point to the article about the City of Chicago. "Chicago" refers to the band Chicago in 2.5% of occurrences and to the musical Chicago in 1.5% of occurrences. In 0.1% of the occurrences, "Chicago" refers to the Chicago Bears professional football team. Various other, more obscure usages, account for the remainder of the occurrences of "Chicago."

Similarly, 32.9% of occurrences of the term "Bears" as a link anchor point to the article about the family of mammals, 3.0% refer specifically to American black bears, 10.7% refer to the Sydney Bears of the Australian Ice Hockey League, and 28.6% refer to the Chicago Bears.

The phrase "Chicago Bears" is very unambiguous, referring to the football team in 99.1% of its occurrences.

Based on this text fragment, the algorithm has identified seven candidate topics, scored as shown in Table 1.

TABLE 1

Example of Term Scoring

| Candidate Topic | Score | Term |
|---|---|---|
| Chicago | 0.906 | "Chicago" |
| Chicago (band) | 0.025 | "Chicago" |
| Chicago (musical) | 0.015 | "Chicago" |
| Bear | 0.329 | "Bears" |
| American Black Bear | 0.030 | "Bears" |
| AIHL Bears | 0.107 | "Bears" |
| Chicago Bears | 0.001 | "Chicago" |
| | +0.991 | "Chicago Bears" |
| | +0.286 | "Bears" |
| | =1.278 | |

Note that this example excludes the TF-IDF factor, and logarithmic P'(t,x) function, for the sake of simplicity. The actual term scores would be weighted by the TF-IDF for each term, and logarithmically scaled as described above, according to an exemplary embodiment.

In Applicants' preliminary experiments with an exemplary embodiment of the topic identifier, Applicants performed a search for whole-word occurrences of each label using a standard regular expression library, according to one exemplary embodiment. The search, according to an exemplary embodiment, represented a major performance bottleneck, as the run time of the lexical stage was directly proportional to the length of the input document. As a result, the lexical stage could take an exemplary approximately 15 minutes or longer for long input documents (such as, e.g., but not limited to, court rulings, etc.), according to an exemplary embodiment.

A major performance optimization for the lexical stage may be achieved, according to an exemplary embodiment, by finding occurrences of the labels using an off-the-shelf text search engine, or other text search, according to an exemplary embodiment.

Another significant performance optimization may be achieved, according to an exemplary embodiment, in the lexical stage by using an exemplary directed acyclic word graph (DAWG) or radix/PATRICIA tree (see Morrison, Donald R., "PATRICIA—Practical Algorithm to Retrieve Information Coded in Alphanumeric," *Journal of the Association for Computing Machinery,* 15, no. 4 (October 1968)) to reduce the number of labels that are checked. As an example, if the input document does not contain the term "Chicago" then searches for any multi-word term that begins with "Chicago," such as "Chicago Bears" (the NFL team), "Chicago Cubs" and "Chicago White Sox" (Major League Baseball teams), or "Chicago Fire" may be reduced or eliminated, according to an exemplary embodiment.

Another optimization strategy, which may be implemented, according to an exemplary embodiment, may include extracting a working set of, e.g., but not limited to, all unique words (bounded by the beginning or end of a line or a whitespace character) from the document. According to an exemplary embodiment, an exemplary lexicon search may be restricted to terms that begin with those words. So, e.g., but not limited to, according to an exemplary embodiment, an exemplary process may only check for an occurrence of the label "Chicago Bears" if "Chicago" is one of the unique words found in the document.

With these exemplary but nonlimiting optimizations, an exemplary implementation of the lexical stage may run in less than 10 seconds on a conventional personal computer (PC) with an exemplary 3 GHz Intel Core 2 Duo central processing unit (CPU) and exemplary 8 GB random access memory (RAM) for documents ranging from an exemplary approximately 3,000 up to approximately 129,000 characters in length. This may represent a substantial performance improvement over the unoptimized lexical stage of the search.

Exemplary Second Stage—Exemplary Semantic Analysis—Exemplary Link Scoring

In an exemplary second stage, referred to as an exemplary semantic analysis stage, which may occur after the exemplary lexical score, linguistic score $L_x$ for each candidate document x has been calculated as described as above in the Lexical stage, according to an exemplary embodiment, an exemplary semantic analysis algorithm, process, system, and/or computer program product may evaluate semantic relationships between candidate documents based on any hyperlinks between the candidate documents, in order to calculate a semantic score $S_x$ for the document, according to an exemplary embodiment. This semantic analysis mechanism may identify the candidate topics that are semantically related and may therefore contribute to a coherent and cohesive analysis of the input document's topics, according to an exemplary embodiment. For example, relevant candidate documents such as "American football," "NFL," "Chicago Bears," and "Lovie Smith" (an article about the former head coach of the Chicago Bears) may have strong semantic relationships represented by hyperlinks in the corpus while spurious candidate documents such as "Chicago (musical)" or "AIHL Bears" do not, according to an exemplary embodiment.

The semantic score S(A) for candidate document A may be calculated according to Equation 2.

Semantic Scoring $$S(A) = \sum_{B \in C} R(A, B) L(B) \quad \text{Equation 2}$$

The semantic score S(A) may be set equal to the sum of the linguistic scores ($L_y$) of other candidate documents, y, that include a hyperlink pointing to A. Note that the semantic scores (S) for each document may be initialized with the lexical score (L), according to one exemplary embodiment.

In the equation, A is the candidate topic being evaluated, C is the set of all candidate topics, L(B) is the lexical score for B (calculated per the exemplary Lexical Stage above) and R(A, B) is a measure of semantic relatedness between A and B with a range of 0.1, according to an exemplary embodiment.

In Applicants' initial implementation, Applicants used a discrete binary function for R(A, B). According to an exemplary embodiment, if a direct hyperlink between A and B existed in the corpus, then R(A, B)=1, otherwise R(A, B)=0. This discrete binary function implementation was reasonably effective, but Applicants recognized that this implementation could be improved.

In Applicants' next implementation, according to another exemplary embodiment, Applicants integrated an exemplary semantic relatedness function such as, e.g., but not limited to, that described by Milne, David, "An Open-Source Toolkit for Mining Wikipedia," *Proceedings of the* 2009 *New Zealand Computer Science Research Student Conference,* 2009. The semantic relatedness function, according to an exemplary embodiment may include an exemplary implementation of an exemplary algorithm described by Milne, David, "Computing Semantic Relatedness using Wikipedia Link Structure," *Proceedings of the* 2007 *New Zealand Computer Science Research Student Conference,* 2007 and may have an exemplary continuous range from 0.1, according to an exemplary embodiment. Although Applicants did not collect specific quantitative data, this embodiment produced a significant subjective improvement in the quality of the overall output from the algorithm, according to an exemplary embodiment.

Most recently, Applicants have developed an additional exemplary embodiment of an algorithm, system, method, and/or computer program product for calculating the semantic relatedness between documents (such as, e.g., but not limited to, Wikipedia articles) in a hypertext corpus that may be based on analyzing the theoretical information content of hyperlinks, according to an exemplary embodiment. Reference is made to the description herein of an exemplary embodiment of the algorithm, according to an exemplary embodiment. In an exemplary case, R(A, A) may be defined to be equal to 1.0, according to an exemplary embodiment.

In another exemplary embodiment of an algorithm, the hypertext corpus can be considered as an exemplary graph, with pages as vertices, and links as edges. The information content of a given edge may be calculated as $$H = -\log_2\left(\frac{deg^-(v) \times deg^+(v)}{V}\right)$$

where H is the information content, v is the vertex associated with the exemplary term, and V is the total number of vertices in the graph, according to an exemplary embodiment. With this equation defined, an exemplary process may iterate through each candidate topic, or some subset of candidate topics, identified by the exemplary lexical stage described in previous paragraphs, and, for each link from the candidate topic being evaluated that connects to another candidate topic, calculate a semantic score, which may be described by $S = \Sigma(L_x \times H)$ where $L_x$ describes the lexical score for each candidate topic in the collection of candidate topics, and H is the information content described above, according to an exemplary embodiment.

Any of these approaches to semantic analysis benefit from well-known optimization techniques, such as pre-processing, sparse matrices, the identity property of R(A, B), and the commutative property of R(A, B), according to various exemplary embodiments.

Figure 2A:
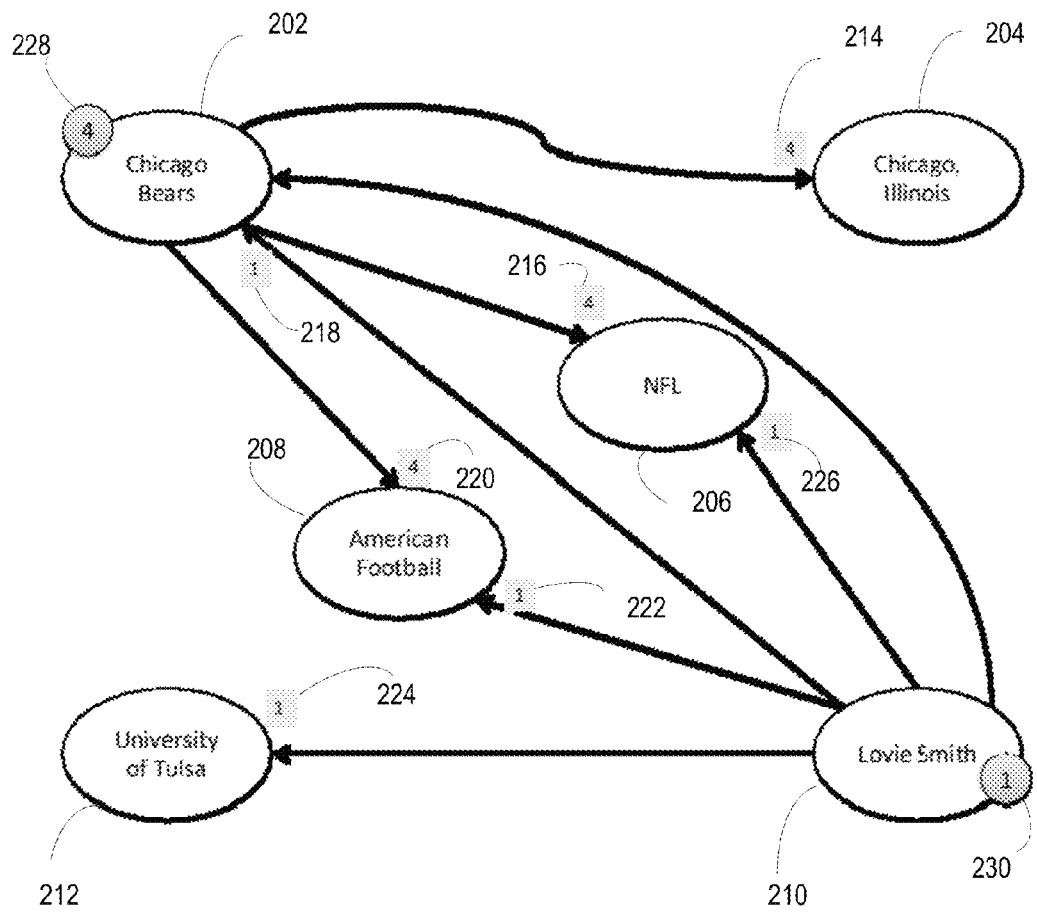
FIG. 2A depicts an exemplary embodiment of an exemplary semantic relatedness network for a given topic as may be used in an exemplary embodiment of an exemplary topic identification system environment.

FIG. 2A shows a simple example of link scoring, according to an exemplary embodiment. In the figure, the shaded circular notations represent the final score awarded to each candidate document by the linguistic scoring stage. The arrows indicate the contribution of each link to the semantic score of the candidate documents.

Table 2A presents one example of how one may reach the example resulting semantic scores of FIG. 2A.

TABLE 2A

Example of Link Scoring

| To | From | Score |
|---|---|---|
| Chicago Bears | Self | 4 |
|  | Lovie Smith | +1 |
|  | Total | =5 |
| Chicago, Illinois | Self | 1 |
|  | Chicago Bears | +4 |
|  | Total | =5 |
| American football | Self | 3 |
|  | Chicago Bears | +4 |
|  | Lovie Smith | +1 |
|  | Total | =8 |
| NFL | Self | 2 |
|  | Chicago Bears | +2 |
|  | Lovie Smith | +1 |
|  | Total | =5 |
| Lovie Smith | Self | 1 |
|  | Total | =1 |

Figure 2B:
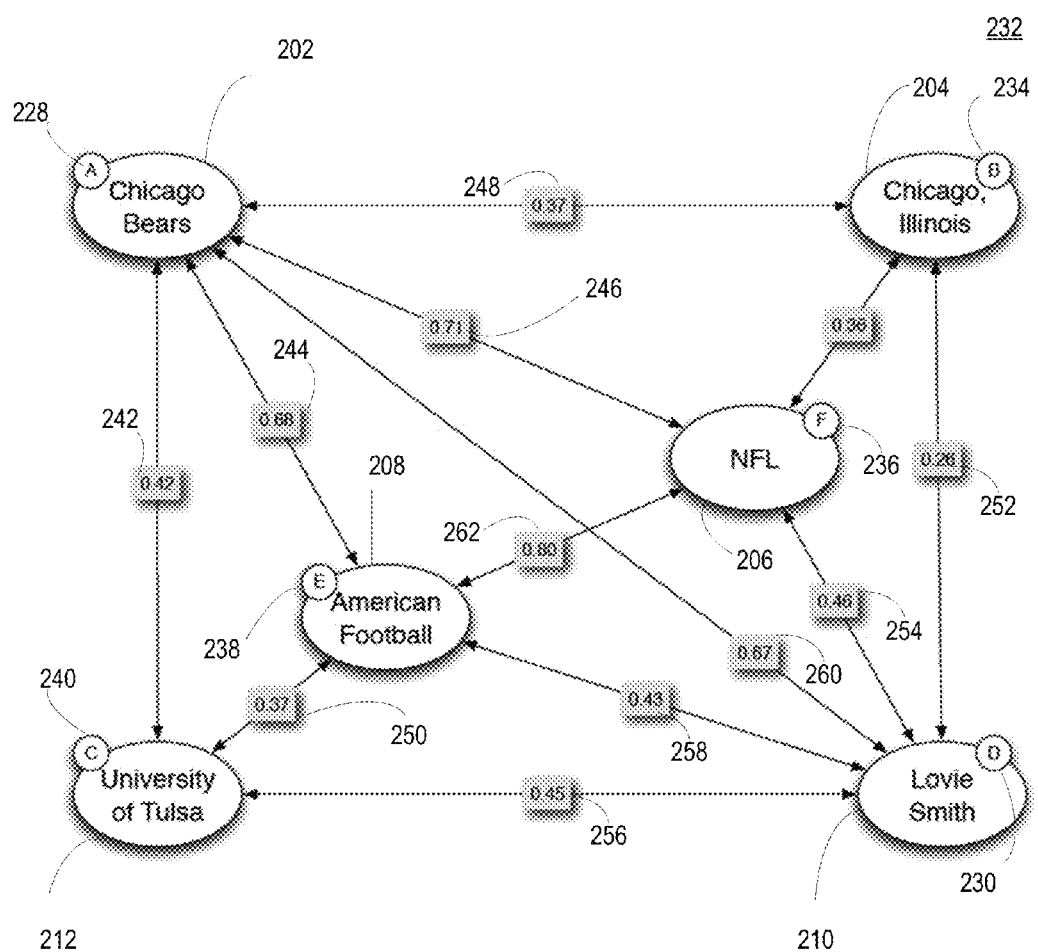
FIG. 2B depicts an exemplary embodiment of an exemplary semantic relatedness network for a given topic, including exemplary scoring, as may be used in an exemplary embodiment of an exemplary topic identification system environment.

FIG. 2B illustrates an exemplary network of selected R(A, B) values calculated with an exemplary semantic analysis stage (such as, e.g., but not limited to, the analysis described in Milne, David, "An Open-Source Toolkit for Mining Wikipedia," *Proceedings of the 2009 New Zealand Computer Science Research Student Conference,* 2009) for an example set of six topics, illustrated in the Tables below. Assume that each of these topics, labeled A through F, had a lexical score L(A) of 10.0. Further, assume that R(A, B) is 0.0 if not otherwise indicated in FIG. 2B.

Table 2B shows another exemplary embodiment of an exemplary calculation of semantic scores relating to FIG. 2B.

TABLE 3B

Example of Semantic Scoring

|   | A | B | C | D | E | F | Total |
|---|---|---|---|---|---|---|---|
| A | 10 | 3.7 | 4.2 | 6.7 | 6.8 | 7.1 | 38.50 |
| B | 3.7 | 10 | 0.0 | 2.6 | 0.0 | 3.6 | 19.90 |
| C | 4.2 | 0.0 | 10 | 4.5 | 3.7 | 0.0 | 22.40 |
| D | 6.7 | 2.6 | 4.5 | 10 | 4.3 | 4.6 | 32.70 |
| E | 6.8 | 0.0 | 3.7 | 4.3 | 10 | 8.0 | 32.80 |
| F | 7.1 | 3.6 | 0.0 | 4.6 | 8.0 | 10 | 33.30 |

Exemplary Third Stage—Exemplary Relevance Weighting

During Applicants' experiments, Applicants found Applicants' algorithm, system, method, and/or computer program product, according to an exemplary embodiment, may, in some cases, award high scores to subjectively irrelevant documents. To address this, an exemplary third stage, of Applicants' topic identification algorithm, an exemplary relevance ranking of the candidate documents may be performed. An exemplary relevance weighting stage, according to an exemplary embodiment may substantially improve results.

As an example, Applicants conducted an experiment to assess the effectiveness of a work-in-progress version of Applicants' algorithm, system, method, and/or computer program product, according to an exemplary embodiment, in the legal domain by using a full text version of the U.S. Supreme Court's well-known *Roe* v. *Wade* decision as an input document. Unexpectedly, the top-ranked document was an article in Wikipedia about "QI", a British television quiz show (Wikipedia contributors, "QI," Wikipedia: The Free Encyclopedia, Wikimedia Foundation, Inc., accessible at en.wikipedia.org/wiki/QI (accessed Aug. 7, 2012)). Applicants analyzed the diagnostic output from Applicants' experiment and found that the "QI" article received a high linguistic score (L) because it was one of the few documents linked from the anchor term "future."

Applicants, according to one exemplary embodiment, inspired in part by the well-known exemplary Page Rank relevance ranking algorithm described in U.S. Pat. No. 6,285,999, to Page et al, the contents of which is incorporated herein by reference in its entirety and Page, Lawrence, Brin, Sergey, Motwani, Rajeev, and Winograd, Terry "The Page Rank Citation Ranking: Bringing Order to the Web," Stanford InfoLab, 1999, noted that the "QI" article had only six incoming links, while more relevant articles (such as "Abortion," "Law," and "U.S. Supreme Court") had several hundred incoming links. This led Applicants to test and incorporate an exemplary relevance weighting stage into Applicants' exemplary algorithm, system, method, and/or computer program product for topic identification.

Applicants' exemplary approach to this task has considered the observation in Adamic, Lada A., and Huberman, Bernardo A., "Zipfs Law and the Internet," Glottometrics, 2002, Vol. 3, and other sources that the distribution of incoming links across documents in a hypertext corpus (such as, e.g., but not limited to, Wikipedia, or the World Wide Web as a whole) follows a Zipf distribution.

Figure 3:
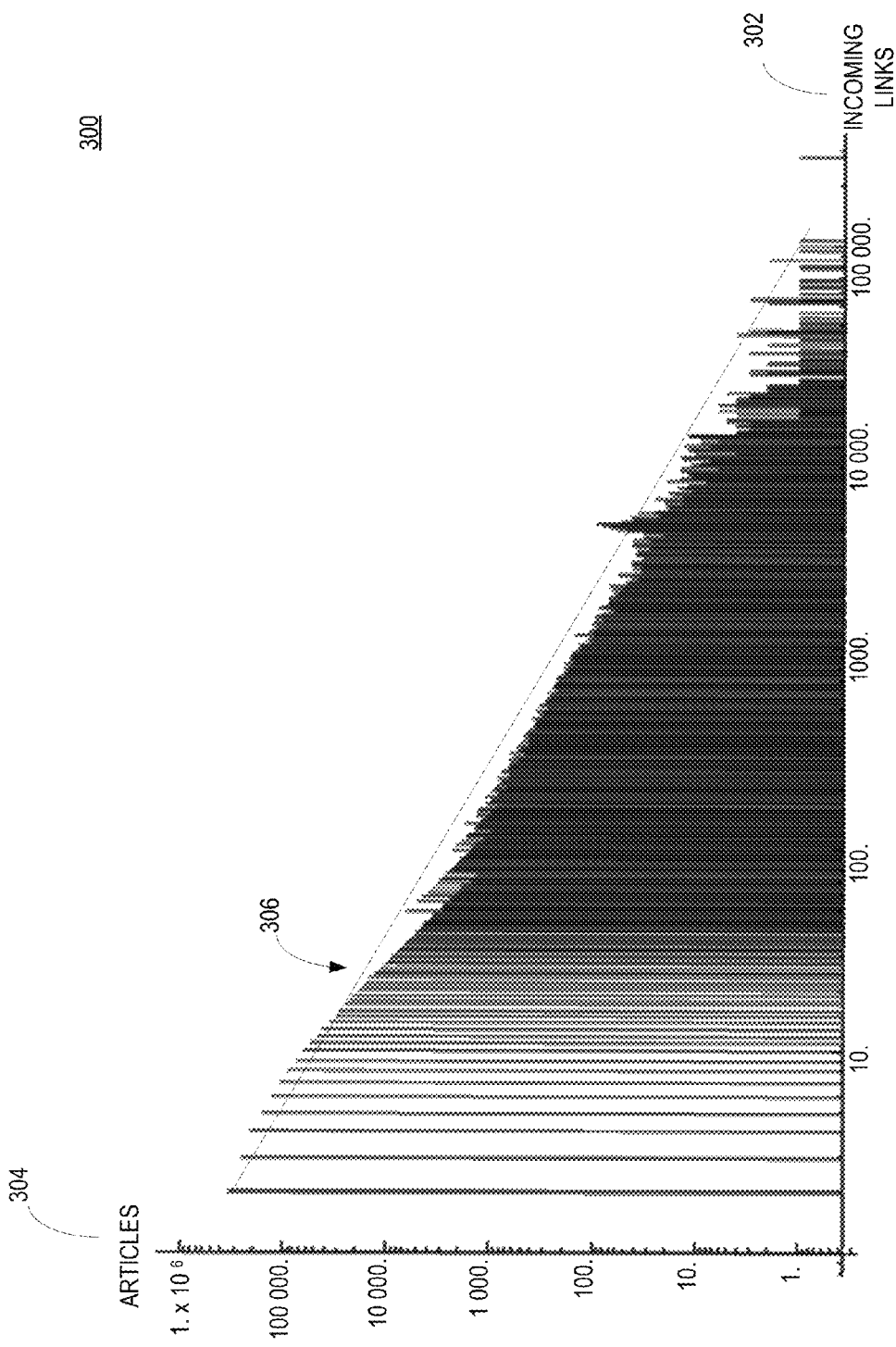
FIG. 3 depicts an exemplary embodiment of an exemplary chart graphing a distribution of Incoming Links in Wikipedia.

FIG. 3 depicts a chart 300, illustrating a log-log histogram plot of the number of incoming links on an x-axis 302, to quantity of articles on a y-axis 304 in Applicants' Wikipedia-derived data set (excluding "orphan" articles without any incoming links). Applicants recognized that the near-linear slope 304 observable on a log-log histogram is a strong empirical indication that the data follows a Zipf distribution.

The parameters of the distribution vary depending on the hypertext corpus. For Applicants' Wikipedia-derived data set, the estimated parameters of the Zipf distribution are n=275768 and ρ=0.439606.

Applicants use the cumulative distribution function (CDF) of a candidate document's incoming links as a weighting factor by which Applicants multiply the semantic score (S) to calculate the document's final score (S'). Therefore, by the definition of the CDF for a Zipf distribution, $$S' = S \times \frac{H_{\rho,s}}{H_{N,s}},$$

where H is the harmonic function, n and ρ are parameters of the Zipf distribution, and s is the candidate document's number of incoming links.

Various Alternative Exemplary Embodiments

Entity Extraction

According to another exemplary embodiment, in some applications, it may be important to identify specific types of entities that may be referenced in a document. Most commonly, these entities may include, e.g., but are not limited to, people, places, organizations, brands, and/or the like, as may be identified by, e.g., but not limited to, a proper noun, etc. An exemplary embodiment of an exemplary algorithm, system, method, and/or computer program product may identify such entities and the semantic stage may even disambiguate them (such as, for example, but not limited to, Rochester, N.Y. versus Rochester, Minn.).

If certain types of entities are especially important in a particular application, a boosting factor may be applied to selected entities or the size of result set can be expanded, according to one exemplary embodiment, to include more topics of this type. Additional labels (or label patterns) can also be incorporated into the lexical stage to detect special types of entities, such as, e.g., but not limited to, stock ticker symbols (e.g., NASDAQ:GOOG, MSFT, etc.), dates (e.g., Jul. 20, 1969 or "next Tuesday"), and times (e.g., "6 pm").

Personalized Corpora

Another exemplary embodiment that can be incorporated into another exemplary embodiment of the exemplary algorithm, system, method, and/or computer program product, may incorporate personalization features, at, e.g., but not limited to, an individual level, and/or group level, etc. According to one exemplary embodiment, one could mark existing topics in the hypertext corpus as being of special interest or correlate topics in the hypertext corpus with personalized topics of interest. According to one exemplary embodiment, the algorithm, system, method, and/or computer program product could boost the semantic score of topics identified in this way. A further incremental improvement, according to one exemplary embodiment, may include extending the hypertext corpus on a personalized basis. This extension may be approached by directly entering any exemplary necessary linguistic and/or semantic data about the exemplary personalized topics, extracting this data from exemplary supplemental corpora, using exemplary document clustering to, e.g., but not limited to, infer the data, and/or any of, or a combination of these exemplary approaches.

Multiple Corpora

Another exemplary embodiment that can be incorporated into another exemplary embodiment of the exemplary algorithm, system, method, and/or computer program product may incorporate multiple exemplary hypertext and/or linguistic corpora. For example, an exemplary embodiment of an exemplary implementation of this algorithm, system, method, and/or computer program product, in an enterprise might utilize Wikipedia as an exemplary general-purpose hypertext corpus along with wikis on the enterprise intranet as domain-specific hypertext corpora, according to an exemplary embodiment. Weighting among a plurality of exemplary corpora could also be customized in such an implementation so that, for example, but not limited to, topics extracted from an intranet wiki, may be, e.g., but not limited to, favored over general-purpose topics extracted from Wikipedia, etc.

Ratio of Content to Links

Another exemplary related factor that can be incorporated into another exemplary embodiment of the exemplary algorithm, system, method, and/or computer program product is the ratio of text (or other content) in a page or other document relative to outgoing links. According to an exemplary embodiment, incorporating the ratio of text or other content to outgoing links could be used to reduce the weight given to pages with large numbers of outgoing links but little or no actual content (such as "list of NFL quarterbacks"). On the Internet, use of such a component or stage may also reduce the weight given to, e.g., but not limited to, "link farms" and/or similar "spam" sites.

During Applicants' experiments with the Wikipedia corpus, Applicants have also encountered some cases where the algorithm may select list-like articles that represented several, granular, closely related concepts rather than any single concept. An example of such an article from Applicants' Chicago Bears test document is "Glossary of American football," which defines terms such as "first down" and "red zone." The algorithm, system, method, and/or computer program product may produce better results if each of these concepts had its own page in the hypertext corpus, rather than being consolidated on a single glossary page. One exemplary embodiment may use an exemplary pragmatic solution to exclude glossaries, lists, and similar pages based on the title conventions of the glossaries, lists and similar pages.

Factoring Term Occurrence Position

In an exemplary term scoring stage, a position of a term's occurrence can be factored into the term score. Lin, Chin-Yew and Hovy, Eduard, "Identifying Topics by Position," 1997 describes one exemplary approach as may be used to factor a term's occurrence information into a term score.

Certain exemplary embodiments of Applicants' exemplary implementation of link scoring may only address candidate documents identified by the term scoring stage that may be directly linked to each other. According to another exemplary embodiment the exemplary algorithm, system, method, and/or computer program product may further incorporate more "distant" (indirectly linked) candidate documents into the link scoring stage with an appropriate distance-based weighting function. However, various exemplary embodiments of experimental results of testing of Applicants' claimed invention were found to be satisfactory without implementing such an approach.

Topic/Sub-Topic

Figure 4:
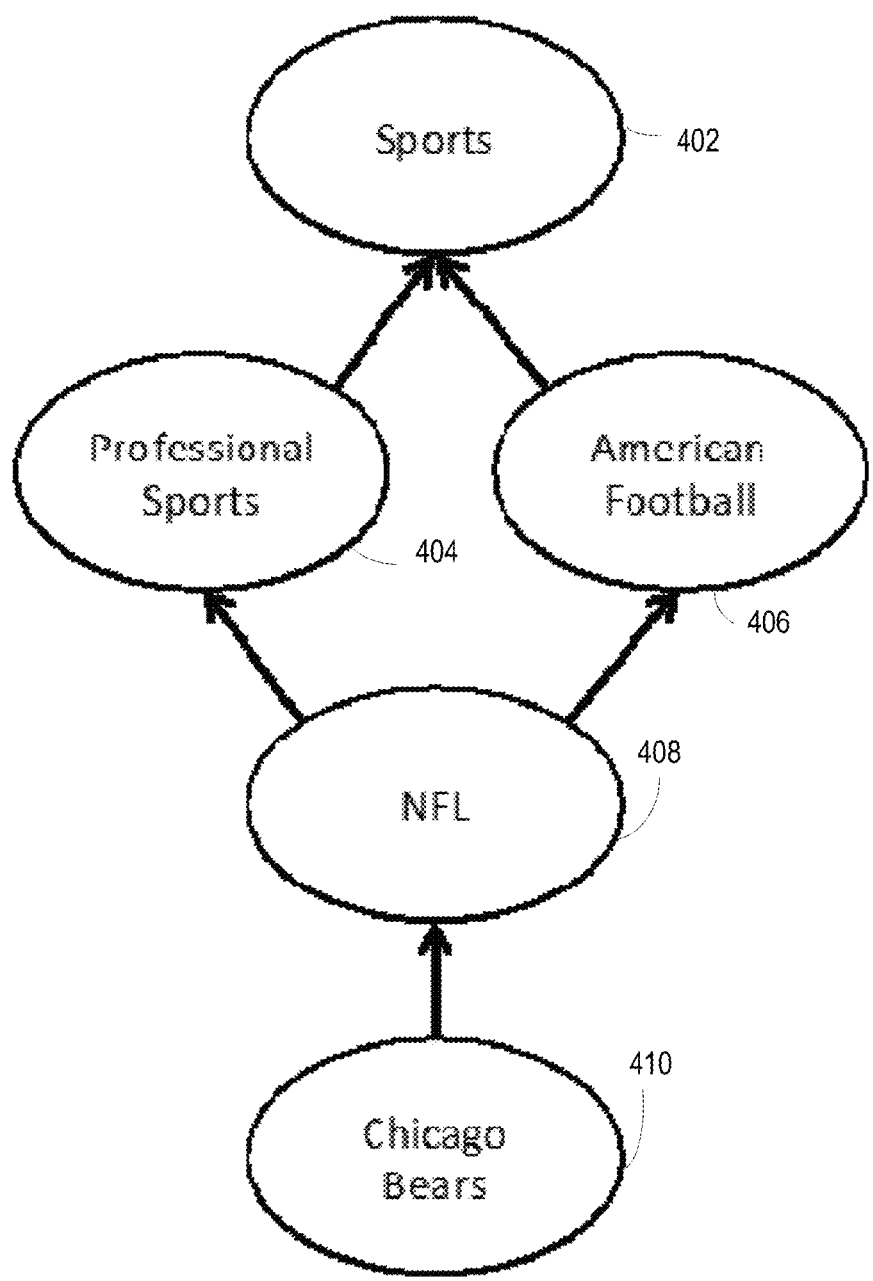
FIG. 4 depicts an exemplary embodiment of an exemplary graph illustrating example topics and subtopics.

FIG. 4 depicts a diagram 400, illustrating an exemplary embodiment of a notional example of a graph, according to another exemplary embodiment. Diagram 400 illustrates an exemplary directed semantic graph representing topic/sub-topic and/or hierarchical relationships (such as, e.g., but not limited to, the category network in Wikipedia), which can also be incorporated into an exemplary embodiment of the exemplary algorithm, system, method, and/or computer program product, using a similar approach. As illustrated in diagram 400, Chicago Bears 410 may be identified as a subtopic of the National Football League (NFL) 408, which may in turn be a subtopic of both Professional Sports 404, and American Football 408. Both Professional Sports 404 and American Football 406 may further be subtopics of Sports 402 more generally.

Optimization

Additional performance improvement may be accomplished by optimizing various exemplary embodiments' performance. Various exemplary embodiments of the exemplary algorithm, system, method, and/or computer program product may be suitable for optimization by familiar optimization techniques, such as, e.g., but not limited to, pre-computation, and/or caching, etc. According to one example embodiment, an optimization may include: a net score awarded to a candidate document d for each occurrence of a term t in the input document can be pre-calculated, taking into account both the proportion of links anchored with term t that point to document d, the frequency of term t in the linguistic corpus, and the relevance weighting of the document based on incoming links.

Parallel Processing—Exemplary Parent-Child Processing

Various exemplary embodiments of the exemplary algorithm, system, method, and/or computer program product may be varied to include parallel processing. The algorithm, system, method, and/or computer program product may also be suitable for parallel processing, which could yield further orders of magnitude performance improvements. One exemplary effective approach, according to an exemplary embodiment to parallelizing the algorithm may include dividing a set of potential anchor terms among a plurality of nodes (e.g., but not limited to, slave and/or child and/or sub nodes, etc.). In this exemplary parallel approach, each slave/child/sub node may perform both term scoring and link scoring steps of the algorithm for an assigned node-specific set of terms and the candidate documents generated by matches with those terms. The master/parent/super node then may calculate the sum of the scores for each candidate document produced by each slave/child/sub node to produce the final, aggregated scores. In one exemplary embodiment, either the master/parent/super or slave/child/sub nodes may perform the relevance stage, or relevance ranking step.

According to an exemplary embodiment, Applicants sought to balance accuracy, response time, domain-independence, and operational costs. Each exemplary stage of the exemplary algorithm, system, method, and/or computer program product, can be tuned by introducing various tuning functions, including any of various well-known tuning functions, ranging from e.g., but not limited to, simple additive or multiplicative boosts, to sophisticated scoring functions, etc., according to other exemplary embodiments. Some specific examples of potential tuning functions may include, according to other exemplary embodiments:

Shaping a prior probability term in the exemplary lexical scoring stage with an exemplary logarithmic function to emphasize the most common senses of a term.

Similarly shaping the TF-IDF term in the exemplary lexical stage to further de-emphasize commonly used terms.

Incorporating exemplary constant multipliers to any, or each exemplary stage of the exemplary algorithm, system, method, and/or computer program product, to adjust the influence of any given stage on the exemplary final output.

Applicants' work, according to various exemplary embodiments of the present invention may integrate various insights from Milne, Medelyan, and other researchers in topic identification with Applicants' own insights to provide a useful, novel, and nonobvious, yet straightforward and effective exemplary algorithm, system, method, and/or computer program product for automatically identifying topics of a document. Applicants' various exemplary embodiments may use a hypertext corpus, such as, e.g., but not limited to, Wikipedia, in combination with word frequency data from a linguistic corpus to accomplish this. The Applicants' various exemplary embodiments are language-independent, domain-independent, and have been empirically demonstrated to be applicable to a variety of subject matter domains. Applicants have also described a variety of potential alternative embodiments that can improve the quality of its results, as well as performance.

Applicants' believe that various exemplary embodiments represent a significant advance in the practical state of the art and science of topic and category identification and have a variety of potential applications. Some example applications may include, e.g., but not limited to:

Automatically indexing, categorizing, linking, and/or tagging content for, e.g., but not limited to, subsequent browsing, searching, and/or retrieval as part of a general-purpose information retrieval and/or knowledge management system. According to an exemplary embodiment, such an exemplary system, method, and/or computer program product can range from Internet-scale Web search engines, directories, and/or social media platforms to enterprise content management systems and/or personal and/or social "notebook" applications and/or applets for portable devices.

Automatically filtering and/or routing dynamic content (for example, but not limited to, from messaging, syndication, and/or social media technologies and/or services such as, e.g., but not limited to, email, IM, chat, SMS, MMS, RSS/Atom, Twitter, Facebook, Tumblr, Myspace, and/or Google+). One specific example of such an application may include automatically identifying new items of dynamic content that may be of potential interest to a user, and/or organizing such identified items by, e.g., topic.

Improving Internet search by allowing search disambiguation or refinement by topic (e.g., "Did you mean Chicago Bears or bears?") and/or grouping search results by topics (e.g., "6 results about Chicago Bears, 4 results about bears").

Improving topic-based Internet dictionaries, such as open-directory.org.

Mapping specific content of an input document to more general topics in a hypertext corpus. A domain-specific example of this in health care may include, e.g., but not limited to, diagnostic support by mapping symptoms documented in a patient's history to potential conditions described in a rich hypertext corpus of medical knowledge.

More generally, the technology, according to various exemplary embodiments of Applicants' invention may have broad applications for knowledge workers and/or end-users in a variety of fields including, e.g., but not limited to, Internet search, enterprise content management, intelligence and security, law, medicine, and/or academia, etc.

Measuring Semantic Relatedness with Information Content

A robust and efficient measure of the degree to which two nodes in a hypertext corpus are related to each other can significantly benefit on-going work in fields including information retrieval (IR), natural language processing (NLP), artificial intelligence (AI), social network analysis, and the Semantic Web, according to an exemplary embodiment. Applicants propose an exemplary approach that may treat a hypertext corpus as a directed graph, may weight edge(s) of this graph based on entropic information content, and may use well-known path-finding algorithms to estimate an extent to which any two nodes in the corpus are related to each other.

Introduction to Measuring Semantic Relatedness

How related, from a semantic perspective, is Albert Einstein, the late theoretical physicist and cosmologist, to Britney Spears, the contemporary American pop singer?

According to one state-of-the-art system (Milne, David, "An Open-Source Toolkit for Mining Wikipedia," Proceedings of the 2009 New Zealand Computer Science Research Student Conference, 2009) (Milne, David, "Computing Semantic Relatedness using Wikipedia Link Structure," Proceedings of the 2007 New Zealand Computer Science Research Student Conference, 2007) these two disparate personalities are 27% related.

Explaining the curious result may provide some useful background information.

There is a hyperlink from the Wikipedia article about Britney Spears to an article about Mariah Carey, another contemporary American pop singer. Milne's system calculates that these two performers are 73% related, which is a reasonable result.

However, the article about Mariah Carey (see Mariah Carey, Retrieved Aug. 4, 2012, from Wikipedia: (en.wikipedia.org/wiki/Mariah Carey), (Accessed on 2012, Aug. 3)) has a hyperlink to the article about Albert Einstein in a brief passage about Carey's 2008 album, E=MC2: "When asked regarding the album title's meaning, Carey said, 'Einstein [en.wikipedia.org/wiki/Albert_Einstein]'s theory [en.wikipedia.org/wiki/Mass%E2%80%93energy_equivalence]? Physics? Me? Hello! . . . Of course I'm poking fun.'" (Mariah Carey, 2012) Based on this direct link, the system evaluates Mariah Carey as being 31% related to Albert Einstein.

Applicants' present work in the Semantic Web and related areas demands a new approach, according to one exemplary embodiment.

Note that Applicants' paper depends on concepts from graph theory, set theory, information theory, and other fields. Applicants feel strongly that authors should make some effort to make their work accessible to the broadest possible audience. Therefore, Applicants have included brief summaries throughout this paper of the relevant foundational concepts as they apply to Applicants' work.

Representing the Wikipedia Ontology as a Graph

In Applicants' work, Applicants represent the Wikipedia ontology as a graph. This representation includes articles (also referred to as topics), hyperlinks between articles, categories, and parent/child relationships between articles and categories. The entire graph is directed, cyclic, and strongly connected. Applicants are currently using a data set derived from the English edition of Wikipedia as of Jul. 22, 2011, but the approach described in this paper is completely independent of language and fully compatible with more recent snapshots of Wikipedia, as well as other hypertext corpora (including the World Wide Web as a whole).

A small but significant feature of Applicants' mapping is that if Wikipedia contains both an article and a category for a given topic (as is the case for both Britney Spears and Mariah Carey in this example), the category and its associated parent/child relationships are consolidated under the node that represents the article. This mitigates the ambiguity associated with two distinct nodes (a topic and a category) referring to the same entity.

Also, Applicants only store one link in each direction between a given pair of nodes in our representation. For Applicants' purposes, the significant pieces of information are simply that at least one link exists from article A to article B and that article A is a child article of category C.

Equally Weighted Edges

In Applicants' work, Applicants require, according to one exemplary embodiment, a measure of semantic relatedness between each pair of adjacent nodes in the graph. In this section, Applicants describe how Applicants calculate this measure, which can then be used to calculate the semantic relatedness between any two arbitrary nodes, as Applicants describe later herein.

Figure 5:
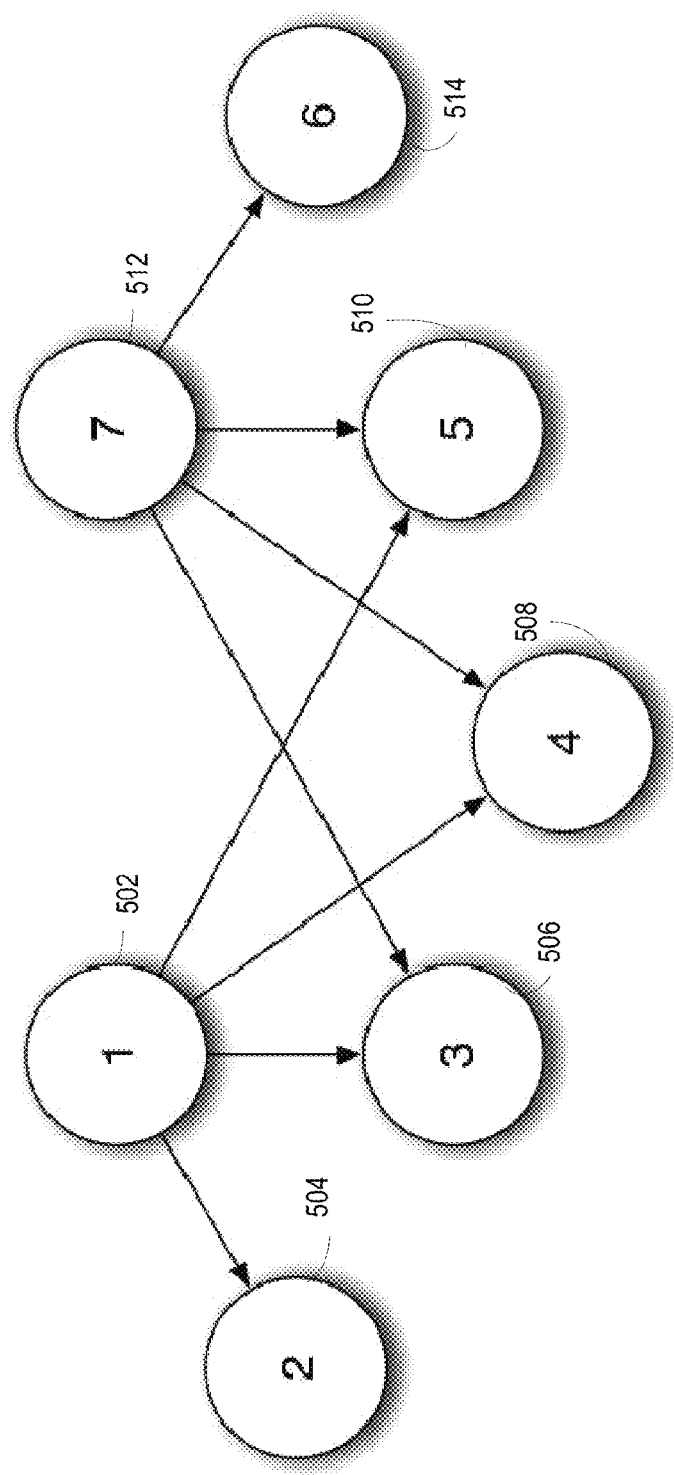
FIG. 5 depicts an exemplary simple graph illustrating a group of adjacent nodes according to an exemplary embodiment.
Figure 6:
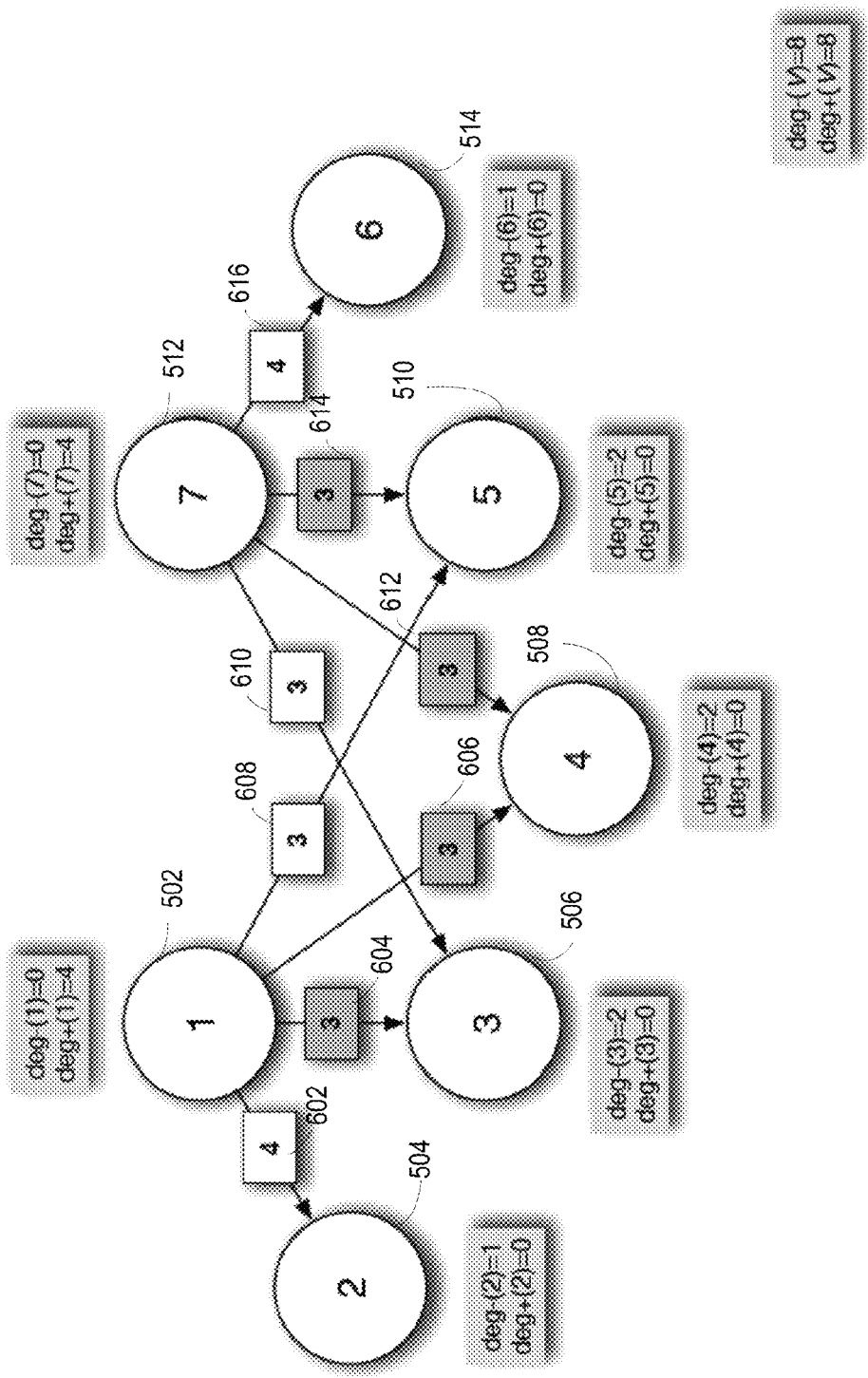
FIG. 6 depicts an exemplary simple graph illustrating an analysis of information content of links in a simple graph according to an exemplary embodiment.
Figure 7:
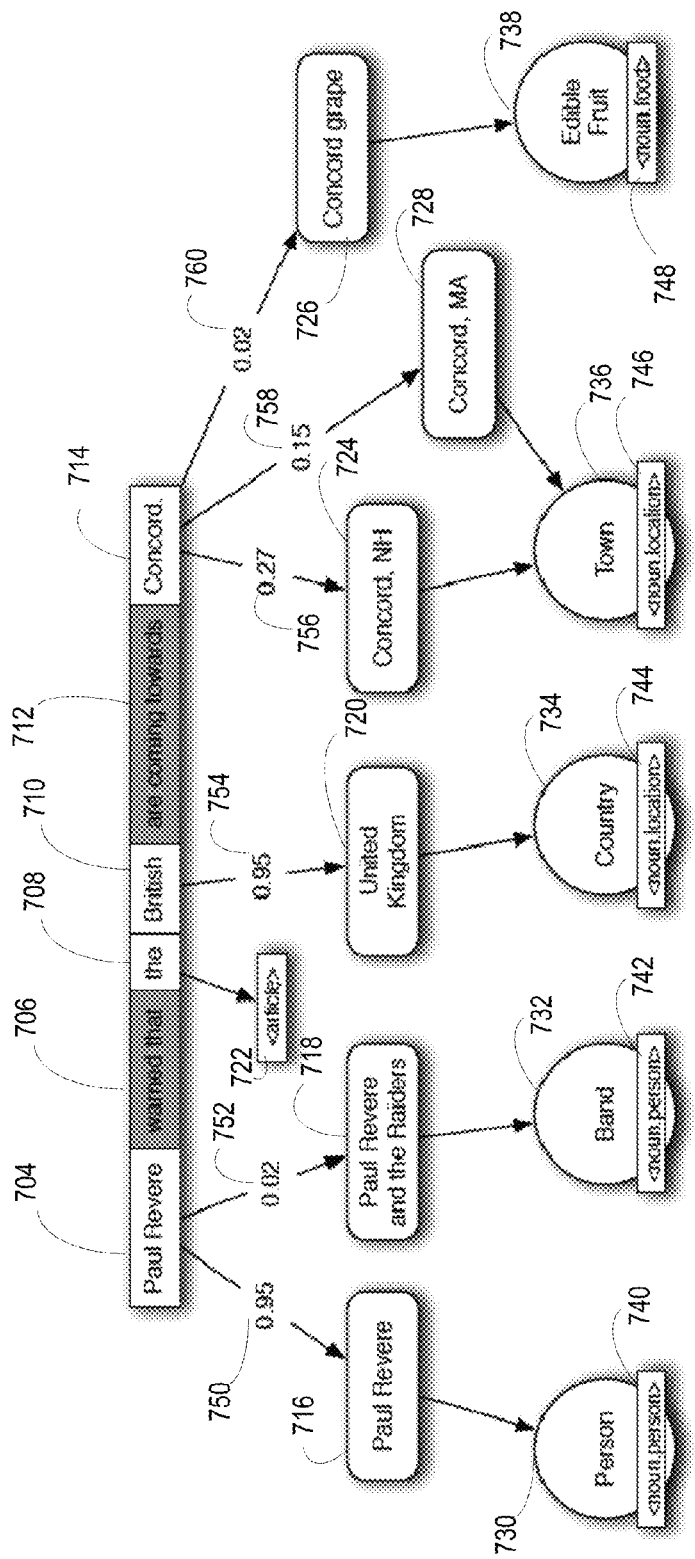
FIG. 7 depicts an exemplary diagram illustrating an analysis of a topic of a sentence according to an exemplary embodiment.
Figure 8:
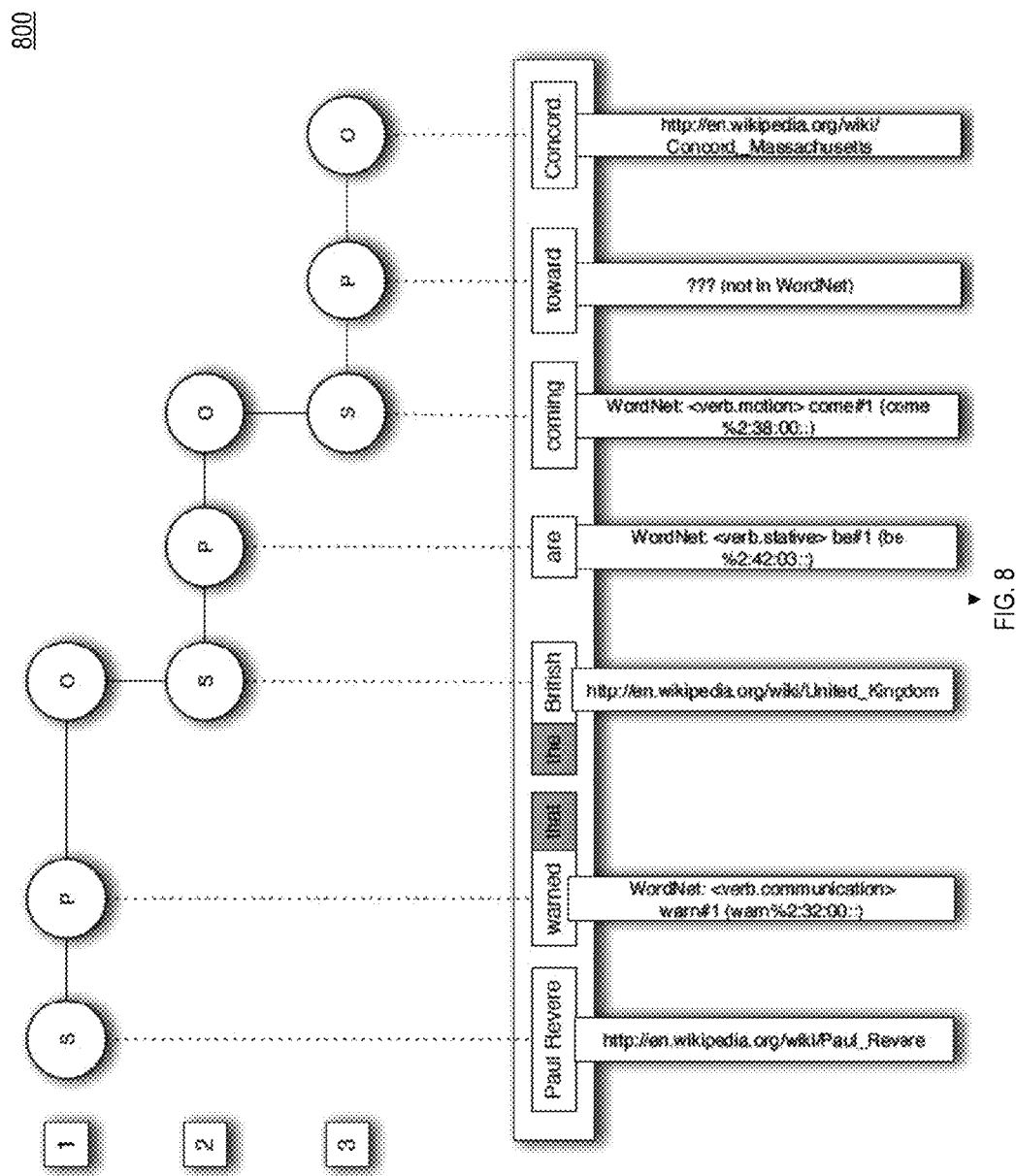
FIG. 8 depicts an exemplary simple graph illustrating an analysis of a topic of a sentence according to an exemplary embodiment.
Figure 9:
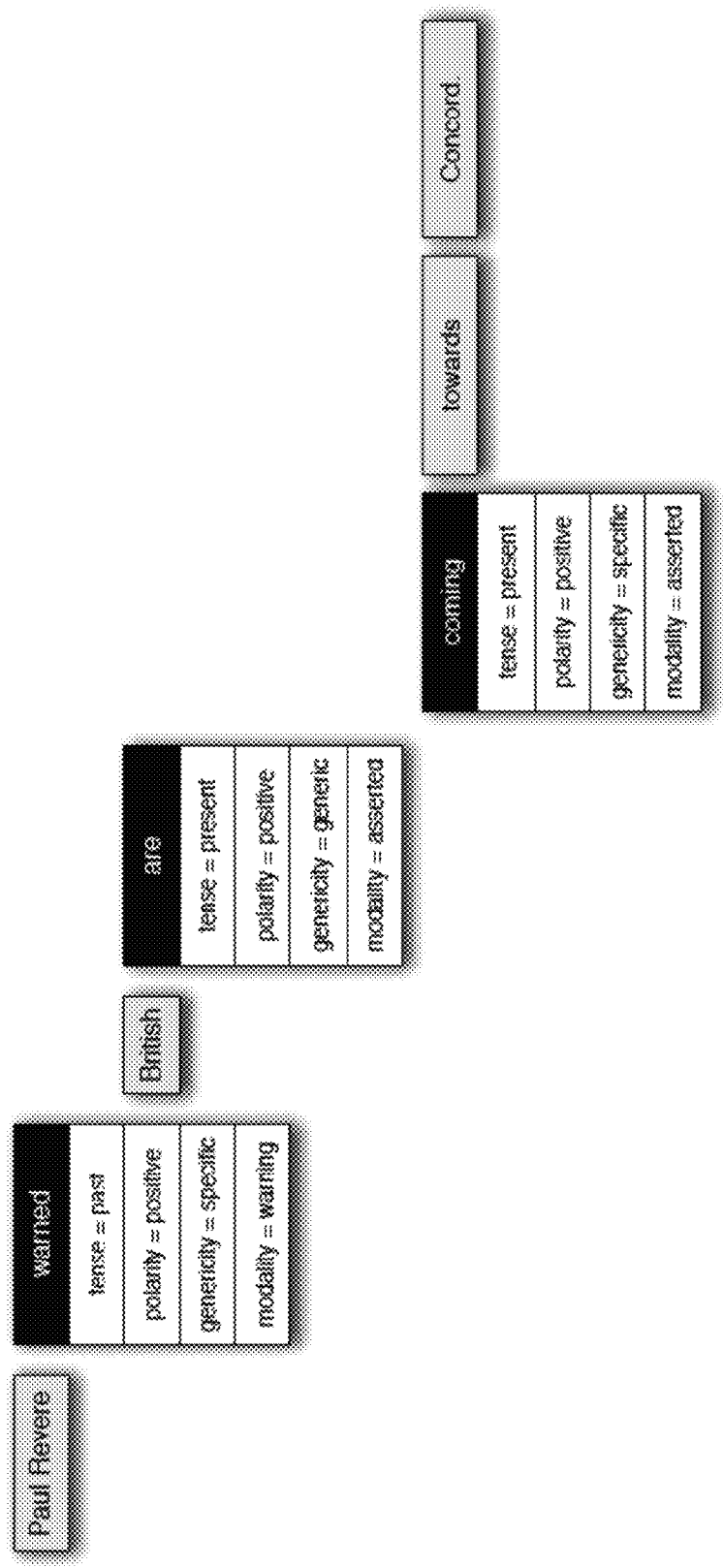
FIG. 9 depicts an exemplary simple graph illustrating an analysis of a topic of a sentence according to an exemplary embodiment.

Consider the simple directed graph shown in FIG. 5. The sample graphs used in FIGS. 5 and 6 are acyclic, but real ontologies from sources like Wikipedia may be cyclic. Applicants' approach is compatible with both cyclic and acyclic graphs. At the most fundamental level, Applicants' approach, like that of Milne and others, attempts to derive a measure of semantic relatedness between two nodes in a graph from the extent to which their links to other nodes are similar.

Calculating Semantic Relatedness with Equally Weighted Links $$R(A, B) = \frac{|(N(A) \cup A) \cap (N(B) \cup B)|}{|\{A, B\} \cup N(A) \cup N(B)|} \quad \text{Equation 3}$$

Equation 3 represents a calculation of the semantic relatedness of vertices A and B that assumes an equal weight for all links. In the equation, $R(A,B)$ is the semantic relatedness, in the range 0.0 . . . 1.0. $N(v)$ is the neighborhood of vertex v (the set of vertices adjacent to vertex v). Because v itself is excluded from the formal definition of $N(v)$ in graph theory, vertices A and B are explicitly added to the intermediate sets.

Expressed in narrative form, Equation 3 means that to calculate the semantic relatedness $R(A, B)$ between A and B, count the number of vertices (nodes) to which both A and B are connected. Add two (one for A and one for B) if and only if A and B are connected to each other. Then count the number of unique vertices to which A, B, or both A and B are connected. Again, add two for vertices A and B. Divide the first result by the second result to obtain a measure of semantic relatedness in the range 0.0 . . . 1.0.

Applying Equation 3 to FIG. 5, we can calculate $R(1, 7)$. Three vertices (3, 4, and 5) are connected to both 1 and 7, which are, in this example, not connected to each other. All seven vertices in FIG. 1 are either A, B, or are connected to A and/or B. Therefore, $R(1, 7)=3/7 \cong 0.428$, meaning vertices 1 and 7 are approximately 42.8% related to each other. If an edge representing a link in either or both directions existed between vertices 1 and 7, $R(1, 7)$ using Equation 3 would be $4/7 \cong 0.571$, mean that vertices 1 and 7 would be approximately 57.1% related to each other.

To improve the algorithm presented above with reference to Equation 3, Applicants can attempt to extract more information from the graph edges.

In Wikipedia, there is a hyperlink from the article about Albert Einstein to the article about the United States. It could represent significant information (such as the fact that Einstein lived and worked in the United States for most of his life and career), but it is effectively lost in the noise of links to the United States from over 300,000 other articles and, to a lesser extent, among the nearly 250 outgoing links from the Albert Einstein article. This information is present in the richer links of the emerging Semantic Web (see Berners-Lee, T., The Semantic Web, *Scientific American*, 284, pp. 34-43, (2001)), but is not present in traditional hyperlinks, which remain far more prevalent in Wikipedia and in the World Wide Web as a whole.

In essence, the only information that Applicants have in this case is that one of the 236 outgoing links to distinct articles from the article about Albert Einstein is one of the 306,213 incoming links from distinct articles to the article about the United States. Applicants propose to apply Claude Shannon's classic framework of information theory (see Shannon, C. E., "A Mathematical Theory of Communication," *The Bell System Technical Journal*, V27, 379-423, (1948)) to extract information content from these links.

Shannon defined a measure of information content in a message referred to as self-information or surprisal. Equation 4 calculates the self-information of a message m.

$$I(m) = -\log_b(p(m)) \quad \text{Equation 4: Self-information}$$

In information theory, a message refers to any transfer of information from one entity to another, through any medium. This definition includes familiar examples of messages such as an email, SMS, or voice-mail message as well as much broader examples. For example, a Web page is, from the perspective of information theory, a message from the author to the readers. Most importantly for our purposes, a single hyperlink is a message with measurable information content.

In this equation, b is the base and p(m) is the probability that message m is chosen from all possible message choices in a message space M. Applicants will set b=2 to measure information in binary digits (bits) throughout this paper.

Now Applicants must define the message space M and the probability p(m) of a given message m. Applicants will use two independent message spaces: one for outgoing links (which correspond to tail endpoints in a graph) and another for incoming links (corresponding to head endpoints in a graph). Recall that Applicants store at most one link in each direction between a pair of nodes. Therefore, for example, if Wikipedia article A had two hyperlinks to article B and article B had one hyperlink to article A, this would be represented by only two edges in Applicants' graph: edge {A, B}, representing both of the hyperlinks from A to B, and edge {B, A}, representing the hyperlink from B to A.

The number of outgoing links from a node (or, more formally, the number of tail endpoints adjacent to a vertex) is referred to as the out-degree and is denoted $deg^+(v)$. Similarly, the number of incoming links to a node (or, more formally, the number of head endpoints adjacent to a vertex) is the in-degree, denoted as $deg^-(v)$.

We will refer to a link from node u to node v as {u, v} and assume a uniform probability distribution across links. Therefore, $$p(u) = \frac{deg^-(u)}{\sum_{i \in V} deg^-(i)} \text{ and } p(v) = \frac{deg^+(v)}{\sum_{i \in V} deg^+(i)},$$

where V is the set of all nodes in the graph.

Given these probability functions, we can now calculate I(u,v), the information content of a link between nodes u and v, using Equation 5.

Information Content of a Link $$I(u, v) = -\log_b \frac{deg^+(u)}{\sum_{i \in V} deg^+(i)} - \log_b \frac{deg^-(v)}{\sum_{i \in V} deg^-(i)} \quad \text{Equation 5}$$

Applicants will now work some examples using our Wikipedia-derived data set. Table 3 presents some basic descriptive statistics for articles in our data set. Of particular interest are the out-degree and in-degree sums, which we will use as the denominators in Equation 5.

TABLE 3

Incoming and Outgoing Link Statistics

|  | Out-degree | In-degree |
|---|---|---|
| Sum | 65,897,062 | 65,657,524 |
| Mean | 18.438 | 18.371 |

TABLE 3-continued

Incoming and Outgoing Link Statistics

|  | Out-degree | In-degree |
|---|---|---|
| Std. Dev. | 37.632 | 315.93 |
| Minimum | 0 | 0 |
| Maximum | 7,931 | 306,213 |

Table 4 presents out-degree and in-degree values for selected articles, which Applicants will use in Applicants' examples.

TABLE 4

Out-degree and In-degree for Selected Articles

| Article | Out-degree | In-degree |
|---|---|---|
| United States | 822 | 306,213 |
| France | 971 | 117,613 |
| England | 1,135 | 106,832 |
| United Kingdom | 946 | 103,351 |
| Germany | 606 | 98,326 |
| Albert Einstein | 236 | 2,368 |
| Britney Spears | 241 | 2,171 |
| Mariah Carey | 369 | 1,505 |

For our first example, consider the link from the Einstein article (u) to the article about the United States (v), where he spent the majority of his adult life and career. Using Equation 5, we can calculate the information content of this link. Referring to Table 4, $deg^+(u)$ is 236 and $deg^-(v)$ is 306,213. The information content associated with the node on the outgoing side of the link (incident to the tail endpoint) is 18.09 bits while the information content associated with the node on the incoming side of the link (incident to the head endpoint) is 7.75 bits, for a total of 25.84 bits.

Now consider the link from Britney Spears to Mariah Carey. Again referring to Table 4, $deg^+(u)$ is 241 and $deg^-(v)$ is 1,505. So, the information content on the outgoing side is 18.06 bits and the information content on the incoming side is 15.42 bits, for a total of 33.48 bits.

Finally, let us calculate the information content of the link that we referenced in the introduction, from the article about Mariah Carey to the article about Albert Einstein. For this link, $deg^+(u)$ is 369 and $deg^-(v)$ is 2,368, so I(u,v) is 32.21 bits. This is comparable to the information content of other, subjectively more meaningful links. We see that weighting links based on their information content is not, by itself, sufficient to improve the calculation of semantic relatedness.

Relating Adjacent Nodes with Information Content in Links

In Equation 3, each link is weighted equally, since the relatedness is calculated only from the portion of adjacent nodes shared by the two nodes in question. As Applicants have seen in the previous section, the information content of links varies widely and this should be reflected in the relatedness calculation.

Applicants begin by revising FIG. 5 to include the information content of each link, calculated using Equation 5. FIG. 6 shows the results. In the figure, the shaded boxes indicate the in- and out-degree for each vertex and for the graph as a whole, while the boxes (some shaded, some not shaded) overlaid on the links show the calculated information content of each link, in bits.

Recall that Applicants' problem in this simple example is to determine the semantic relatedness between nodes 1 and 7. Applicants will first present a visual solution, and then develop it into an analytical solution.

The dark shaded link weights in FIG. 6 indicate links to nodes that are linked to both node 1 and 7, while the link weights that are not shaded indicate links to nodes that are linked to either node 1 or node 7, but not both.

Applicants now calculate the sum of the shaded link weights, which represents the overlapping information content that nodes 1 and 7 and is 12 bits in this example. Next, Applicants calculate the sum of all the link weights (shaded and not shaded), representing the total information content of nodes 1 and 7. This is 20 bits.

Finally, Applicants divide the overlapping information content (12 bits in our example) by the total information content (20 bits in our example) to obtain a measure of the semantic relatedness of the two nodes. The result is 0.6 or 60%, meaning that node 1 and node 7 are 60% related to each other based on the information content represented by their links.

From this visual solution, Applicants derive the analytical solution in Equation 6.

Semantic Relatedness from Information Content in Hyperlinks $$R(A, B) = \frac{\sum_{\{u,v\} \in \{A|B\}, v\} \cap \{u,\{A|B\}\}} I(u, v)}{\sum_{\{u,v\} \in \{(A|B\}, v\} \cup \{u,(A|B)\}} I(u, v)} \quad \text{Equation 6}$$

Like the visual solution, R(A, B) from Equation 6 is a measure of semantic relatedness in the range 0 . . . 1.

Path-Finding

The R(A, B) semantic relatedness function that Applicants presented in the immediately preceding section applies only if A and B are directly adjacent or co-adjacent through a third node C, according to an exemplary embodiment.

The method can be generalized to any two connected nodes by applying a weighted path-finding algorithm, such as Dijkstra's Algorithm (Dijkstra, 1959) or one of its more modern derivatives.

To do this, set the cost of the path edges (distinct from the hyperlink edges used elsewhere in this method) between each pair of co-adjacent nodes to the complement of I(u, v):1.0−I(u, v). Execute the weighted path-finding algorithm to find a low-cost path between any two connected nodes A and B. The relatedness between the two nodes will be the product of the cost of each step in the path, as formally expressed in Equation 7.

Semantic Relatedness on a Path $$\prod_{i=1}^{i=|p|-1} R(p_i, p_{i+1}) \quad \text{Equation 7}$$

The algorithm may be improved by using non-uniform distribution functions for links in the calculation of I(u, v). The co-incidence of edges (the likelihood that if vertex A is adjacent to vertex B, it is also adjacent to vertex C) may also be factored into the distribution function in order to produce a more robust measurement of the information content of a link.

It may also be beneficial to incorporate a non-uniform probability distribution of individual in- and out-degrees. As Applicants noted above with reference to FIGS. 1E-4 for Wikipedia and (see Adamic, Lada A., and Huberman, Bernardo A., "Zipfs Law and the Internet," Glottometrics, 2002, Vol. 3) and others noted for the World Wide Web as a whole, the frequency distribution of incoming links to a page may be closely approximated by a Zipf distribution. Applicants speculate, but have not yet confirmed, that a similar distribution function applies to outgoing links. The weighting function may be improved by incorporating these more sophisticated distribution functions.

Exemplary Information Management Applications

An exemplary embodiment may comprise, a system, method, and/or computer program product for exemplary organization and management of information. Such an exemplary system may provide capabilities to collect, organize, discover, and/or act upon information, according to an exemplary embodiment.

An exemplary embodiment may provide capabilities to collect information from a variety of electronic sources, including, e.g., but not limited to, Web pages, RSS/Atom feeds, social networks, blogs, micro-blogs, electronic documents, electronic books, document scanners, and/or barcode readers, etc.

An exemplary embodiment may use any of the exemplary systems, methods and/or computer program products for topic identification described herein to, e.g., but not limited to, automatically tag collected information, and/or to automatically establish links between entities in a knowledge base, etc. Various exemplary embodiments may also provide capabilities to, e.g., but not limited to, create, update, modify, and/or delete, etc., links between entities in an exemplary knowledge base.

An exemplary embodiment may provide capabilities to discover new content from exemplary electronic sources that may be relevant to the user based on criteria that may include, e.g., but is not limited to, information that the user may have stored in the knowledge base and the nature of the user's interactions with the knowledge base. Such interactions may include, e.g., but are not limited to, storing information, linking information, reading or viewing information, expressing a positive or negative preference toward, interest in, or affinity for entities in the knowledge base, sharing information with other users, and/or performing an action on an entity, etc.

An exemplary embodiment may provide capabilities to, e.g., but not limited to, perform exemplary actions on entities in the knowledge base. According to an exemplary embodiment, these exemplary actions may be context-sensitive depending on the nature of the entity in the knowledge base. Examples of actions may include, e.g., but are not limited to, sharing an entity with other users via an electronic mail, and/or social networking system, purchasing goods or services or performing other commercial transactions associated with an entity, searching for additional information about any entity, viewing other entities associated with entity, and/or setting an appointment or reminder, etc.

Exemplary Knowledge Base

According to an exemplary embodiment, an exemplary knowledge base may include, e.g., but is not limited to, a relational database, a graph database, a semantic database, and/or other information repository, etc. The knowledge base, according to an exemplary embodiment, may include, e.g., but not limited to, entities and/or relationships, etc.

According to an exemplary embodiment, the exemplary knowledge base may include and/or reference one or more ontologies, including external ontologies and ontologies derived from online encyclopedias or other hypermedia databases (including, but not limited to, the World Wide Web in whole or in part). The knowledge base may include and/or reference data from external data sources, including, e.g., but not limited to, flat and/or relational databases, hypermedia databases, and/or social networks, according to an exemplary embodiment. Some specific examples of public data sets that may be included in or referenced by the exemplary knowledge base may include, e.g., but are not limited to, Wikipedia, WordNet, OpenCyc, and UMBEL, etc., according to an exemplary embodiment.

According to an exemplary embodiment, the knowledge base may associate one or more human- and/or machine-readable identifiers with each entity, such that a single entity may be resolved and/or addressed through any of the associated identifiers.

According to an exemplary embodiment, the knowledge base may provide a flexible schema. In the flexible schema, according to an exemplary embodiment, one or more types may be associated with an entity. The exemplary types may define, in human- or machine-readable forms, the properties and relationships between entities of that type, according to an exemplary embodiment.

According to an exemplary embodiment, exemplary types may include metadata to support dynamic viewing, editing, and validation of the properties of and relationships between entities and, more broadly, to support data quality processes. Metadata for the automation of workflows and business processes may also be associated with entities in the knowledge base, according to an exemplary embodiment.

The exemplary knowledge base may include, according to an exemplary embodiment, a mechanism to associate units of measurement with individual properties, according to an exemplary embodiment. The mechanism to associate units of measurement is in contrast to most current databases and similar repositories, where the units of measurement for a given field or property are defined by the application, which can introduce conversion errors. Therefore, instead of defining the units of measurement for a person's height to be inches at the schema or application level, each instance of a property that represented a person's height could have an associated unit of measurement, according to an exemplary embodiment. Therefore, according to an exemplary embodiment, if the height of some person was entered in centimeters, the value would be stored as centimeters, rather than converted to inches for storage.

The exemplary knowledge base may include, e.g., but not limited to, a mechanism to express and/or perform calculations on uncertain (sometimes referred to as "fuzzy") values, according to an exemplary embodiment.

The exemplary knowledge base may include, according to an exemplary embodiment, a mechanism to store multiple values for a single property. Such values could be referenced along one or more dimensions, including, e.g., but not limited to, temporal and/or spatial dimensions, etc.

According to an exemplary embodiment, the knowledge base may include an exemplary mechanism to attribute every data element (including individual property values) to a cited source. Such sources may include, e.g., but is not limited to, an authenticated user or a reference to a data element in an external system, accompanied by a date/time stamp, according to an exemplary embodiment.

The exemplary knowledge base may include, e.g., but not limited to, a mechanism to group related sets of properties and/or relationships. For example, an entity representing a person may have one set of properties and relationships describing his or her clothing sizes and another set of properties describing his or her favorite entertainers, compositions, and performances, according to an exemplary embodiment.

An exemplary knowledge base may include, according to an exemplary embodiment, a mechanism to express knowledge in terms of infinitely nestable statements. Such statements may be expressed as, e.g., but are not limited to, subject-predicate-object triplets.

According to an exemplary embodiment, the knowledge base may include, e.g., but not limited to, mechanisms to support learning, reasoning, and/or goal-seeking/utility optimization functions, etc. The exemplary mechanism may include, e.g., but is not limited to, rules-based inference mechanisms, machine learning, inductive and deductive reasoning, forward and backward chaining, fuzzy logic, statistical analysis methods, and/or Bayesian probability and/or inference, etc., in an exemplary embodiment.

An exemplary knowledge base may further include and/or reference one or more lexicons, including external lexicons and/or lexicons derived from online encyclopedias, and/or other hypermedia databases (including, e.g., but not limited to, the World Wide Web in whole or in part), etc.

Exemplary Natural Language Processing

According to an exemplary embodiment, an exemplary knowledge base may include, e.g., but not limited to, directly, and/or by reference, one or more lexicons. WordNet (wordnet.princeton.edu/) is a representative example of such a lexicon, according to an exemplary embodiment.

The exemplary lexicons may include, and/or have associated with them, groupings of cognitive synonyms (often referred to as "synsets") that may express a distinct cognitive concept, according to an exemplary embodiment.

Exemplary lexicons may include, or may have associated with them, machine-understandable definitions of words, phrases, and other terms, etc. These machine-understandable definitions may be expressed in terms of properties and relationships between entities, according to an exemplary embodiment. For example, the machine-understandable definition of the term "married" (as in, "John married Jane") might be expressed as creating a relationship of type "marriage" between two entities of type "person." That relationship, in term, might have other absolute and/or probabilistic inferences associated with it, i.e., that both the subject and object meet the legal and cultural age requirements to be married in their society, that (in most Western cultures) neither the subject or object have a simultaneous relationship of type "marriage" to other entities, that the subject and object also have a relationship of type "love" between them, and that the subject and object are likely of opposite genders.

According to an exemplary embodiment, exemplary lexicons may also include, or may have associated with them, sentence frames. An exemplary sentence frame may provide an archetype for the use of a term. For example, "<person> married <person>" is an appropriate sentence frame for a sentence like "John married Jane." "<person> married <person> and <person>" is an appropriate sentence frame for a sentence like "Father Smith married John and Jane." The latter example does not mean that Father Smith, John, and Jane are now all married to each other, but that Father Smith performed the marriage ceremony that created the marriage relationship between John and Jane. These two sentence frames are associated with different senses of the word "married."

An exemplary embodiment may include a natural language processing component, which may translate unstructured text and/or other natural language content into, e.g., but not limited to, entities, properties, and/or relationships in the knowledge base. Natural language processing, according to an exemplary embodiment, may include, e.g., but not limited to, one or more of the following steps:

1) Identifying entities in the input stream using exemplary embodiments of the system, method, and/or computer software product that are the subject of the present invention.

2) Identifying entities in the input stream using other entity extraction techniques.

3) Matching the input stream to sentence frames to disambiguate senses, tenses, and/or other dimensions of words, phrases, and/or terms.

4) Applying the machine-understandable definitions to create, update, and/or modify entities, properties, and/or relationships in the exemplary lexicon.

According to an exemplary embodiment, a two-way feedback process between computational linguistics, knowledge representation, and/or reasoning processes to extract semantically-rich entities, properties, and relationships from unstructured and semi-structured natural language content may be provided.

Exemplary Context-Based Access Control

According to an exemplary embodiment, an exemplary information management system may include an exemplary context-based access control (CBAC) authorization mechanism. Like other authorization mechanisms in computer/information security, the CBAC authorization mechanism, according to an exemplary embodiment, may determine whether a given principal (typically, but not always, a human operator), authenticated with a given set of credentials, is authorized to perform a given operation on a given resource.

As in a role-based access control (RBAC) system, zero and/or more roles (such as, e.g., but not limited to, "administrator," "sales representative," "manufacturing supervisor," and/or "human resources manager") may be associated with a principal, according to an exemplary embodiment. As in an attribute-based access control (ABAC) system, zero and/or more attributes (such as, e.g., but not limited to, security clearance, in a military or intelligence-related application), may be associated with a principal, according to an exemplary embodiment.

An exemplary CBAC may include, in an exemplary embodiment, a superset of the RBAC and/or ABAC paradigms that may introduce three key additional abstractions. According to an exemplary embodiment, the first example of these exemplary abstractions may include that multiple identities may be associated with a single principal. For example, a user may have one identity (user name/password combination, two-factor authentication key, or similar) in one security domain and/or another identity in another security domain. Both of those identities may refer to the same principal, namely the user.

The second key additional example abstraction in an exemplary CBAC is that one and/or more contexts may be associated with a given resource. For example, in an exemplary sales force automation (SFA) application, each sales representative may be represented as both a resource and/or a principal and may be associated with a context that may represent a sales territory (e.g., "US Mid-Atlantic Region").

The third key additional example abstraction in an exemplary CBAC is that permissions may be granted and/or denied directly to a principal (or to a group of principals defined by enumeration or by filtering criteria) and/or to a role (or similarly-defined group of roles), as in previous authorization mechanisms, and/or may also to a position with which a principal may be associated. A position in an exemplary CBAC may typically, but not always, correspond to a position in an organizational structure and may have one and/or more associated scopes.

For example, according to an exemplary embodiment, in the SFA example embodiment, an example position "Sales Manager, US Mid-Atlantic Region" may have an associated role "Sales Manager" and an associated context "US Mid-Atlantic Region." Based on the Sales Manager's role as a Sales Manager, the Sales Manager for the US Mid-Atlantic Region may have certain permissions, but those permissions would only apply to resources in the context of the US Mid-Atlantic Region because of the scope of the Sales Manager's position, according to an exemplary embodiment.

An additional feature of the exemplary CBAC mechanism is that permissions may be delegated on permanent, temporary, and/or conditional basis, according to an exemplary embodiment.

The exemplary CBAC mechanism may further include policy decision points (PDPs), according to an exemplary embodiment. The PDPs may grant and/or deny permissions based on all of the factors described herein, including, e.g., but not limited to, the principal, the roles and/or attributes associated directly with the principal, the positions associated with the principal, permissions delegated to the principal, and/or the context of the resource being accessed, etc.

The exemplary CBAC model may also be used to route workflows and/or business processes, according to an exemplary embodiment. For example, if a sales representative must obtain authorization from a sales manager in order to apply a non-standard discount to an order, the sales manager to whom the request for authorization should be routed may be determined from the same data model and abstractions (including, e.g., but not limited to, roles, permissions, position, scope, and/or context) used by the exemplary PDPs in an exemplary embodiment of CBAC.

According to an exemplary embodiment, various exemplary embodiments of the claimed invention may be incorporated into, or integrated as features of, e.g., but not limited to, a search engine product or other customer software application program products including, e.g., but not limited to, electronic communication application programs, electronic mail application programs, collaboration application programs, social media environment application programs, communication application programs, knowledge management programs, personal information management application programs, decision support application programs, customer service application programs, customer relationship management application programs, industry focused application programs, intelligence support application programs, defense department application programs, medical industry application programs, litigation support application programs, sales force automation application programs, human resource management application programs, homeland security application programs, counter-terrorism application programs, insurance industry claims processing application programs, securities regulatory industry application programs, securities and/or financial industry communication application programs, prospectus and/or securities voting/proxy communication automation application programs; financial industry check image processing software application program, banking communication application programs, and/or law enforcement industry application programs).

Exemplary Processing and/or Communications Embodiments

Figure 10:
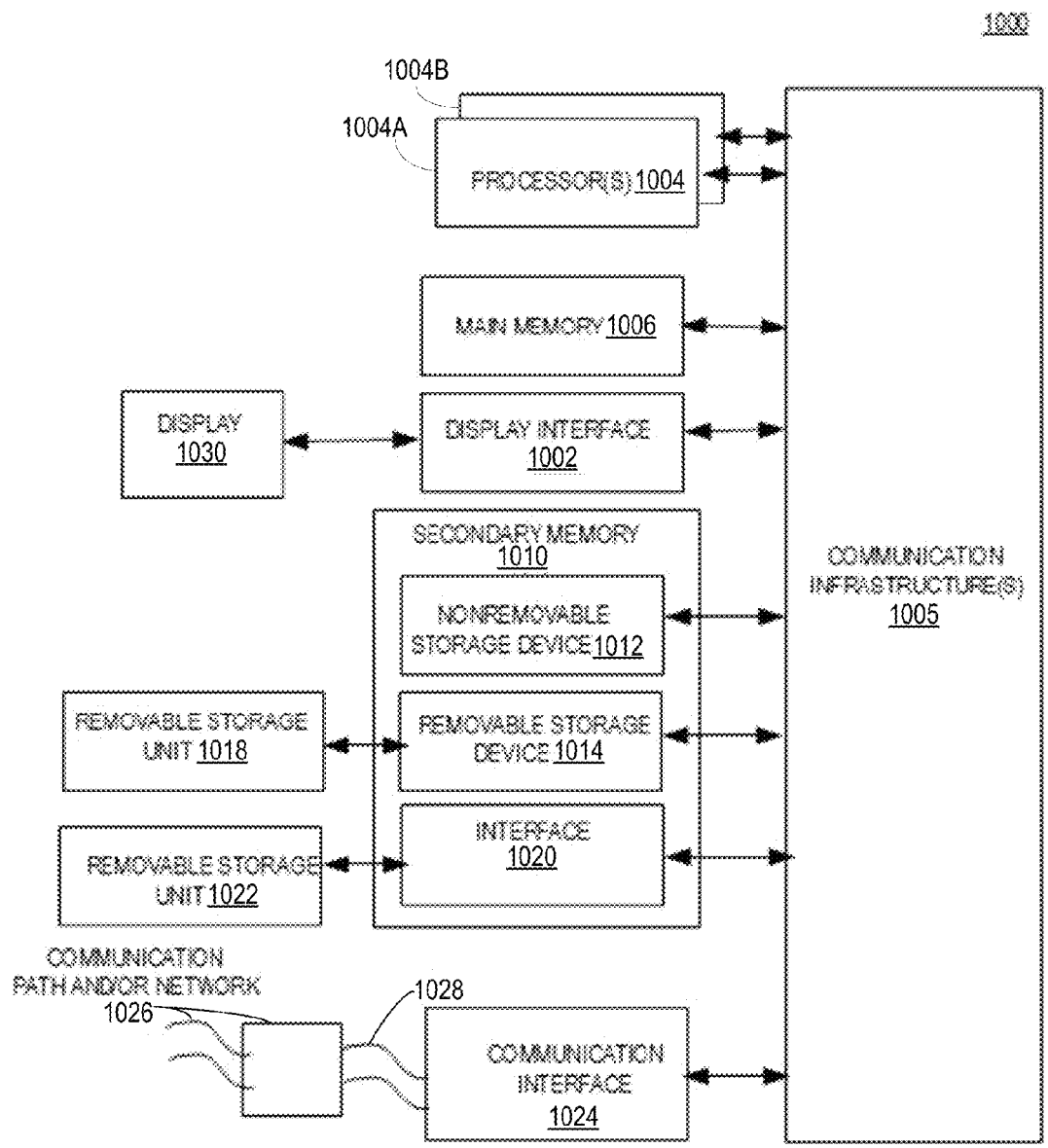
FIG. 10 depicts a diagram 1000 of an exemplary device, as may be used as an exemplary communications and/or computing device in any of various client devices, and/or server devices or other components of the exemplary systems as described herein, according to an exemplary embodiment.
Figure 11:
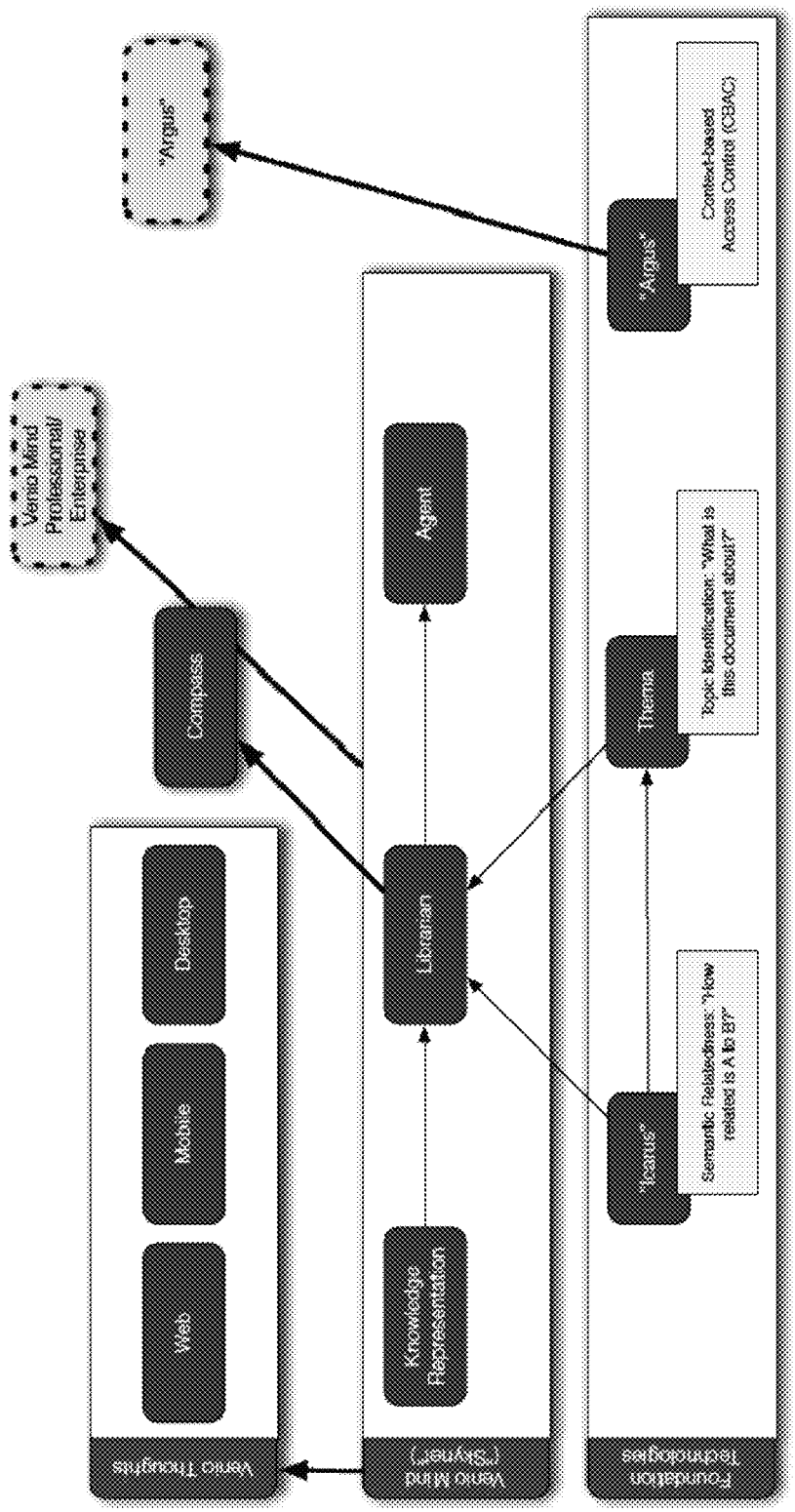
FIG. 11 depicts an exemplary diagram illustrating an exemplary software application architecture for delivery of exemplary topic identification services offerings, according to various exemplary embodiments of the present invention.

FIG. 10 depicts an exemplary diagram of an exemplary computing device hardware architecture illustrating an exemplary device as may be used in any of various client, host, peer and/or server devices, according to an exemplary embodiment of the present invention. FIG. 10, specifically, depicts an exemplary embodiment of a computer system 1000 that may be used in association with, in connection with, and/or in place of, but not limited to, any of the foregoing components and/or systems, according to an exemplary embodiment. Various exemplary electronic computer systems may be networked to one another and integrated to collectively compute and perform elements of the exemplary embodiments. Such computing systems may include, e.g., but are not limited to, one or more, or many of, a server, a web server, an application server, a host, a client, a computing device, a load balancer, a client computing device, a mobile device, a phone, a cell phone, a mobile phone, a personal digital assistant, a cluster device, a network device, a router, a bridge, a gateway, a user device, a collection device, an organization device, a discovery device, an action device, a workflow management device, a database management system, an online electronic encyclopedia device, an online data corpus device, an online Wikipedia electronic encyclopedia device, an online database, an online dictionary, and/or communication device, among others, etc., according to various exemplary embodiments. It should be noted, however, that the exemplary embodiments of the invention may be implemented on any computing device(s), processor(s), computer(s) and/or communications device(s).

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1000 is shown in FIG. 10, depicting an exemplary embodiment of a block diagram of an exemplary computer system useful for implementing the present invention. Specifically, FIG. 10 illustrates an example computer 1000, which in an exemplary embodiment may be, e.g., (but not limited to) a personal computer (PC) system running an operating system such as, e.g., (but not limited to) Windows Mobile for Pocket PC, or Microsoft Windows 7/8/XP/NT/98/2000/XP/CE, etc. available from Microsoft Corporation of Redmond, Wash., U.S.A., Solaris from Sun Microsystems of Santa Clara, Calif., U.S.A., OS/2 from IBM Corporation of Armonk, N.Y., U.S.A., Mac OS, Mac OS X, iOS, etc., from Apple Corporation of Cupertino, Calif., U.S.A., etc., Android from Google Corporation, or any of various versions of Unix (a trademark of the Open Group of San Francisco, Calif., USA) including, e.g., Linux, HPUX, IBM AIX, and SCO Unix, etc. However, the invention may not be limited to these platforms. Instead, the invention may be implemented on any appropriate computer system, communications, or other device, running any appropriate operating system. In one exemplary embodiment, the present invention may be implemented on a computer system operating as discussed herein. An exemplary computer system, computer 1000 is shown in FIG. 10. Other components of the invention, such as, e.g., (but not limited to) a computing device, a communications device, a telephone, a personal digital assistant (PDA), a personal computer (PC), a handheld PC, an iPhone, an iPad, a mobile phone, a tablet, a cell phone, client workstations, thin clients, thick clients, proxy servers, network communication servers, remote access devices, client computers, server computers, routers, web servers, data, media, audio, video, telephony or streaming technology servers, tablet, smartphone, etc., may also be implemented using a computer such as that shown in FIG. 10.

The computer system 1000 may include one or more processors, such as, e.g., but not limited to, processor(s) 1004. The processor(s) 1004 may be connected to a communication infrastructure 1006 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1000 may include a display interface 1002 that may forward, e.g., but not limited to, graphics, text, and other data, etc., from the communication infrastructure 1006 (or from a frame buffer, etc., not shown) for display on the display unit 1030. The computer system 1000 may also include, e.g., but not limited to, a main memory 1008, random access memory (RAM), and a secondary memory 1010, etc. The secondary memory 1010 may include, e.g., but not limited to, a hard disk drive 1012 and/or a removable storage drive 1014, representing a floppy diskette drive, a magnetic tape drive, an optical disk drive, a compact disk drive CD-ROM, an SD ram card, a flash device, a USB storage device, etc. The removable storage drive 1014 may, e.g., but not limited to, read from and/or write to a removable storage unit 1018 in a well-known manner. Removable storage unit 1018, also called a program storage device or a computer program product, may represent, e.g., but not limited to, a floppy disk, magnetic tape, optical disk, compact disc, etc. which may be read from and written to by removable storage drive 1014. As will be appreciated, the removable storage unit 1018 may include a computer usable storage medium having stored therein computer software and/or data.

In alternative exemplary embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as, e.g., but not limited to, those found in some video game devices), a removable memory chip (such as, e.g., but not limited to, an erasable programmable read only memory (EPROM), or programmable read only memory (PROM) and associated socket, and other removable storage units 1022 and interfaces 1020, which may allow software and data to be transferred from the removable storage unit 1022 to computer system 1000.

Computer 1000 may also include an input device such as, e.g., (but not limited to) a mouse or other pointing device such as a digitizer, and a keyboard or other data entry device (none of which are labeled).

Computer 1000 may also include output devices, such as, e.g., (but not limited to) display 1030, and display interface 1002. Computer 1000 may include input/output (I/O) devices such as, e.g., (but not limited to) communications interface 1024, cable 1028 and communications path 1026, etc. These devices may include, e.g., but not limited to, a network interface card, and modems (neither are labeled). Communications interface 1024 may allow software and data to be transferred between computer system 1000 and external devices. Examples of communications interface 1024 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1024 may be in the form of signals 1028 which may be electronic, electromagnetic, optical or other signals capable of being received by communications interface 1024. These signals 1028 may be provided to communications interface 1024 via, e.g., but not limited to, a communications path 1026 (e.g., but not limited to, a channel). This channel 1026 may carry signals 1028, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1014, a hard disk installed in hard disk drive 1012, and signals 1028, etc. These computer program products may provide software to computer system 1000. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 1008 and/or the secondary memory 1010 and/or removable storage units 1014, also called computer program products. Such computer programs, when executed, may enable the computer system 1000 to perform the features of the present invention as discussed herein. In particular, the computer programs, when executed, may enable the processor 1004 to provide a method to resolve conflicts during data synchronization according to an exemplary embodiment of the present invention. Accordingly, such computer programs may represent controllers of the computer system 1000.

In another exemplary embodiment, the invention may be directed to a computer program product comprising a computer readable medium having control logic (computer software) stored therein. The control logic, when executed by the processor 1004, may cause the processor 1004 to perform the functions of the invention as described herein. In another exemplary embodiment where the invention may be implemented using software, the software may be stored in a computer program product and loaded into computer system 1000 using, e.g., but not limited to, removable storage drive 1014, hard drive 1012 or communications interface 1024, etc. The control logic (software), when executed by the processor 1004, may cause the processor 1004 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application-specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired or wireless networks. Wired networks include any of a wide variety of well-known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultra-wideband (UWB), etc. Bluetooth is an emerging wireless technology promising to unify several wireless technologies for use in low power radio frequency (RF) networks. IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11a, b, d and g, (including, e.g., but not limited to IEEE 802.11g-2003, etc.), etc.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. A method of improving accuracy of computerized topic identification comprising:
a domain independent, language independent, computer processor automated topic identification analysis method,
the method comprising:
a) deriving, by at least one computer processor, a lexicon from at least one hypertext corpus data set to associate at least one term with at least one topic,
wherein said at least one term comprises at least one word,
wherein at least one sense is derived from at least one hypertext link of the at least one hypertext corpus data set, and is associated with each of said at least one term,
wherein each of said at least one sense refers to a single topic of said at least one term,
wherein said at least one topic referred to by said at least one sense is to be used as a candidate topic at runtime,
wherein a prior probability is associated with each of said at least one sense of said each said term,
wherein each said prior probability is a fraction of occurrences of a given one of said at least one term as a relationship comprising a hypertext link that links to said single topic from said each of said at least one sense;
b) receiving, by the at least one computer processor, at least one content document;
c) searching for, by the at least one computer processor, at least one term from the lexicon derived from the at least one hypertext corpus data set, and finding the at least one term from the lexicon appearing in the at least one content document to determine at least one candidate topic of the at least one content document;
d) lexically scoring, by the at least one computer processor, each of said at least one candidate topic found appearing in the at least one content document based on the at least one term found in said search of said (c) of the at least one content document to obtain a lexical score for each of said at least one candidate topic, and
accumulating said lexical score for each of said at least one candidate topic for each occurrence in the at least one content document of a term, wherein the term has an associated sense, wherein the associated sense refers to said each said candidate topic,
wherein said lexically scoring comprises
lexically scoring, by the at least one computer processor, based on:
a number of occurrences of the at least one term found in the at least one content document,
a weighting factor representing a relative importance of the at least one term found, and
the prior probability of the sense of the at least one term found; and
e) semantically scoring, by the at least one computer processor, the at least one candidate topic found in the at least one content document, based on a degree to which any plurality of candidate topics are semantically related to each other comprising:
i. quantifying a semantic relatedness score, by the at least one computer processor, of said any plurality of topics based on theoretical information content of co-adjacent links of a graph representation of the at least one hypertext corpus data set,
ii. evaluating the semantic relatedness score, by the at least one computer processor, comprising
evaluating said theoretical information content of an edge of said graph,
wherein said theoretical information content comprises at least one of:

A. self-information, or
B. surprisal and;
iii. semantically scoring, by the at least one computer processor, based on said lexical score of said each of said at least one candidate topic found appearing in the at least one content document, wherein said lexical score of said each of said at least one candidate topic was determined from the at least one term of said lexicon derived from the hypertext corpus data set, and based on said semantic relatedness score from said quantifying; and
wherein said at least one data set comprises:
a hypertext corpus comprising
at least one graph, wherein said graph comprises:
a plurality V of vertices, wherein each individual vertex v represents a page; and
a plurality of edges, each edge representing a link; and
wherein said each edge comprises:
information content I(u,v),
wherein said information content I comprises $$I(u, v) = -\log_b \frac{deg^+(u)}{\sum_{i \in V} deg^+(i)} - \log_b \frac{deg^-(v)}{\sum_{i \in V} deg^-(i)}$$

wherein I is the information content,
wherein v is the vertex associated with a term,
wherein V is the total number of vertices in the graph,
wherein {u,v} refer to an edge from vertex u to vertex v,
wherein $deg^+(u)$ is the out-degree or number of outgoing edges from the vertex u or number of tail endpoints adjacent to a vertex, and
wherein $deg^-(v)$ is the in-degree or number of incoming edges to the vertex v or number of head endpoints adjacent to a vertex.

2. The method according to claim 1, further comprising:
iterating through at least one of:
each candidate topic, or
a subset of candidate topics, identified by a lexical stage; and
calculating a semantic score S, for each link from a first said candidate topic being evaluated that couples to another said candidate topic,
wherein $S = \Sigma(L_x \times H)$,
wherein $L_x$ describes the lexical score for each said candidate topic in a collection of said candidate topics.

3. The method according to claim 1 further comprising:
f) weighting, by the at least one computer processor, said at least one candidate topic identified in said at least one received content document for relevance based on at least one of an algorithmic analysis or a statistical analysis of at least one relationship between said plurality of candidate topics in the at least one data set.

4. The method according to claim 3, wherein said weighting comprises:
calculating, by the at least one computer processor, a weighting u, for a given term based on an occurrence of said given term in an input document,
wherein $$u = 1.0 - \frac{\sin\left(\frac{s}{t}\right)}{2},$$

wherein s comprises a starting offset of a match into said input document; and
wherein t comprises a total length of said input document.

5. The method according to claim 3, wherein an occurrence of a term in an early or a late portion of said content document is indicative of a greater significance than otherwise.

6. The method according to claim 3, wherein the at least one relationship comprises a hypertext link.

7. The method according to claim 1, wherein a significance of said degree of relatedness is weighted based on the information content of said degree of relatedness.

8. The method according to claim 1 further comprising:
calculating, by the at least one computer, similarity between a plurality of topics based on the information content of edges that connect vertices associated with each topic to topics associated with co-adjacent vertices of said each topic.

9. The method according to claim 1 further comprising:
f) calculating similarity between two or more topics based on the information content of edges that couple vertices associated with each topic to topics associated with co-adjacent vertices of the each topic.

10. The method according to claim 1, wherein said lexically scoring comprises at least one of:
accumulating, by the at least one computer processor, at least one lexical score for a given candidate topic across at least one occurrence of the at least one term, which has at least one sense that refers to said given candidate topic;
lexically scoring, by the at least one computer processor, based on a probability that the at least one term has a particular sense that refers to a particular topic;
lexically scoring, by the at least one computer processor, based on a frequency of the at least one term in at least one of:
the at least one data set; or
an external linguistic corpus; or
lexically scoring, by the at least one computer processor, based on a relative position of each of said at least one occurrence of the at least one term in the at least one content document.

11. The method according to claim 1, further comprising taking action, comprising at least one of:
filtering content based on the at least one analyzed topic; or
highlighting content based on the at least one analyzed topic.

12. The method according to claim 1, further comprising analyzing comprising:
iv) weighting, by the at least one computer processor, the at least one candidate topic for relevance based on at least one of:
an algorithmic analysis, or
a statistical analysis
of the at least one relationship in the at least one data set.

13. The method according to claim 1, wherein the method further takes into account at least one of:
at least one sense of meaning;
at least one tense; or
at least one other dimension.

14. The method according to claim 1, wherein said deriving, by the at least one computer processor, of said lexicon from said at least one data set to associate said at least one term with said at least one topic, comprises:

wherein said at least one data set comprises at least one hypertext corpora as a source of lexical knowledge about said at least one term and meaning of said term, and wherein said at least one term comprises a link label or a link anchor.

15. A computerized data processing analysis system of improving accuracy of computerized topic identification, comprising:

at least one memory; and at least one topic identification computer processor coupled to said at least one memory, said at least one topic identification computer processor configured to:

execute a domain independent, language independent, computer processor automated topic identification analysis module, wherein said at least one topic identification computer processor is configured to:

derive a lexicon from at least one hypertext corpus data set to associate at least one term with at least one topic, wherein said at least one term comprises at least one word, wherein at least one sense is derived from at least one hypertext link of the at least one hypertext corpus data set, and is associated with each of said at least one term, wherein each of said at least one sense refers to a single topic of said at least one term, wherein said at least one topic referred to by said at least one sense is to be used as a candidate topic at runtime, wherein a prior probability is associated with each of said at least one sense of said each said term, wherein each said prior probability is a fraction of occurrences of a given one of said at least one term as a relationship comprising a hypertext link that links to said single topic of said each of said at least one sense;

receive at least one content document;

search for at least one term from the lexicon derived from the at least one hypertext corpus data set, and find the at least one term from the lexicon that appears in the at least one content document to determine at least one candidate topic of the at least one content document;

lexically score each of said at least one candidate topic found that appears in the at least one content document based on the at least one term found in said search of the at least one content document to obtain a lexical score for each of said at least one candidate topic, and wherein said at least one topic identification computer processor is configured to:

accumulate said lexical score for each of said at least one candidate topic for each occurrence in the at least one content document of a term, wherein the term has an associated sense, wherein the associated sense refers to said each said candidate topic;

lexically score based on:

a number of occurrences of the at least one term found in the at least one content document, a weighting factor representing a relative importance of the at least one term found, and the prior probability of the sense of the at least one term found; and semantically score the at least one candidate topic found in the at least one content document based on a degree to which any plurality of candidate topics are semantically related to each other comprising:

wherein said at least one topic identification computer processor is configured to:

quantify a semantic relatedness score of said any plurality of topics based on theoretical information content of co-adjacent links of a graph representation of data, evaluate the semantic relatedness score comprising wherein said at least one topic identification computer processor is configured to evaluate the theoretical information content of an edge of said graph, wherein said theoretical information content comprises at least one of:

self-information, or surprisal; and semantically score based on said lexical score of said each of said at least one candidate topic found appearing in the at least one content document, wherein said lexical score of said each of said at least one candidate topic was determined from the at least one term of said lexicon derived from the hypertext corpus data set and based on said semantic relatedness score from said quantify, wherein said at least one topic identification computer processor is configured to:

weight said at least one candidate topic for relevance based on at least one of algorithmic analysis, or statistical analysis of semantic relatedness, and wherein said each edge comprises:

information content I(u,v), wherein said information content I comprises $$I(u, v) = -\log_b \frac{deg^+(u)}{\sum_{i \in V} deg^+(i)} - \log_b \frac{deg^-(v)}{\sum_{i \in V} deg^-(i)}$$

wherein I is the information content, wherein v is the vertex associated with a term, wherein V is the total number of vertices in the graph, wherein {u,v} refer to an edge from vertex u to vertex v, wherein $deg^+(u)$ is the out-degree or number of outgoing edges from the vertex u or number of tail endpoints adjacent to a vertex, and wherein $deg^-(v)$ is the in-degree or number of incoming edges to the vertex v or number of head endpoints adjacent to a vertex.

16. The system according to claim 15, wherein said at least one topic identification computer processor is configured to at least one of:

accumulate at least one lexical score for a given candidate topic found appearing in the at least one content document, across at least one occurrence of the at least one term, which has at least one sense that refers to said given candidate topic;

lexically score based on a probability that the at least one term has a particular sense that refers to a particular topic;

lexically score based on a frequency of the at least one term in at least one of:

the at least one data set; or an external linguistic corpus; or lexically score based on a relative position of each of said at least one occurrence of the at least one term in said at least one content document.

17. A nontransitory computer program product embodied on a nontransitory computer readable medium, said computer program product comprising program logic, which when executed on at least one computer processor performs a computerized data processing method of improving accuracy of computerized topic identification comprising:
- a domain independent, language independent, computer processor automated topic identification analysis method,
- the method comprising:
- a) deriving, by the at least one computer processor, a lexicon from at least one hypertext corpus data set to associate at least one term with at least one topic,
- wherein said at least one term comprises at least one word,
- wherein at least one sense is derived from at least one hypertext link of the at least one hypertext corpus data set, and is associated with each of said at least one term,
- wherein each of said at least one sense refers to a single topic of said at least one term,
- wherein said at least one topic referred to by said at least one sense is to be used as a candidate topic at runtime,
- wherein a prior probability is associated with each of said at least one sense of said each said term,
- wherein each said prior probability is a fraction of occurrences of a given one of said at least one term as a relationship comprising a hypertext link that links to said single topic from said each of said at least one sense;
- b) receiving, by the at least one computer processor, at least one content document;
- c) searching for, by the at least one computer processor, at least one term from the lexicon derived from the at least one hypertext corpus data set, and finding the at least one term from the lexicon appearing in the at least one content document to determine at least one candidate topic of the at least one content document;
- d) lexically scoring, by the at least one computer processor, each of said at least one candidate topic found appearing in the at least one content document based on the at least one term found in said search of said (c) of the at least one content document to obtain a lexical score for each of said at least one candidate topic, and accumulating said lexical score for each of said at least one candidate topic for each occurrence in the at least one content document of a term, wherein the term has an associated sense, wherein the associated sense refers to said each said candidate topic, wherein said lexically scoring comprises
  - lexically scoring, by the at least one computer processor, based on:
    - a number of occurrences of the at least one term found in the at least one content document,
    - a weighting factor representing relative importance of the at least one term found, and
    - the prior probability of the sense of the at least one term found; and
- e) semantically scoring, by the at least one computer processor, the at least one candidate topic found in the at least one content document based on a degree to which any plurality of candidate topics are semantically related to each other comprising:
  - i. quantifying a semantic relatedness score, by the at least one computer processor, of said any plurality of topics based on theoretical information content of co-adjacent links of a graph representation of the at least one hypertext corpus data set,
  - ii. evaluating the semantic relatedness score, by the at least one computer processor, comprising
    - evaluating said theoretical information content of an edge of said graph,
      - wherein said theoretical information content comprises at least one of:
        - A. self-information, or
        - B. surprisal; and
- f) semantically scoring, by the at least one computer processor, based on said lexical score of said each of said at least one candidate topic derived from the hypertext corpus data set, wherein the data processing method comprises wherein said lexically scoring comprises at least one of:
  - i) accumulating, by the at least one computer processor, at least one lexical score for a given candidate topic across at least one occurrence of the at least one term, which has at least one sense that refers to said given candidate topic;
  - ii) lexically scoring, by the at least one computer processor, based on a probability that the at least one term has a particular sense that refers to a particular topic;
  - iii) lexically scoring, by the at least one computer processor, based on a frequency of the at least one term in at least one of:
    - the at least one data set; or
    - an external linguistic corpus; or
  - iv) lexically scoring, by the at least one computer processor, based on a relative position of each of said at least one occurrence of the at least one term in said at least one content document, and
  - wherein said each edge comprises:
    - information content I(u,v),
      - wherein said information content I comprises $$I(u, v) = -\log_b \frac{deg^+(u)}{\sum_{i \in V} deg^+(i)} - \log_b \frac{deg^-(v)}{\sum_{i \in V} deg^-(i)}$$

wherein I is the information content,
wherein v is the vertex associated with a term,
wherein V is the total number of vertices in the graph,
wherein {u,v} refer to an edge from vertex u to vertex v,
wherein $deg^+(u)$ is the out-degree or number of outgoing edges from the vertex u or number of tail endpoints adjacent to a vertex, and
wherein $deg^-(v)$ is the in-degree or number of incoming edges to the vertex v or number of head endpoints adjacent to a vertex.

* * * * *